(12) United States Patent
Miao et al.

(10) Patent No.: US 12,093,646 B2
(45) Date of Patent: Sep. 17, 2024

(54) SYSTEMS AND METHODS FOR SEMI-SUPERVISED EXTRACTION OF TEXT CLASSIFICATION INFORMATION

(71) Applicant: Recruit Co., Ltd., Tokyo (JP)

(72) Inventors: Zhengjie Miao, Mountain View, CA (US); Yuliang Li, Mountain View, CA (US); Xiaolan Wang, Mountain View, CA (US); Wang-Chiew Tan, Mountain View, CA (US)

(73) Assignee: RECRUIT CO., LTD., Tokyo (JP)

( * ) Notice: Subject to any disclaimer, the term of this patent is extended or adjusted under 35 U.S.C. 154(b) by 387 days.

(21) Appl. No.: 17/151,088

(22) Filed: Jan. 15, 2021

(65) Prior Publication Data

US 2022/0229984 A1    Jul. 21, 2022

(51) Int. Cl.
*G06F 40/284* (2020.01)
*G06F 40/289* (2020.01)
(Continued)

(52) U.S. Cl.
CPC .......... *G06F 40/284* (2020.01); *G06F 40/289* (2020.01); *G06N 5/04* (2013.01); *G06N 20/00* (2019.01)

(58) Field of Classification Search
CPC ...... G06F 40/284; G06F 40/289; G06F 40/30; G06F 16/35; G06N 5/04; G06N 20/00
See application file for complete search history.

(56) References Cited

U.S. PATENT DOCUMENTS 8,180,717 B2 * 5/2012 King ..................... G06N 20/00 706/45
9,633,007 B1 * 4/2017 Brun .................. G06F 16/9024
(Continued)

FOREIGN PATENT DOCUMENTS

CN    113704459 A  * 11/2021
JP    4796664 B1    10/2011
(Continued)

OTHER PUBLICATIONS

Yuliang Li, Aaron Feng, Jinfeng Li, Saran Mumick, Alon Halevy, Vivian Li, Wang-ChiewTan, Subjective Databases, arXiv: 1902.09661v4[cs.DB] Jul. 24, 2019 (Year: 2019).*

(Continued)

*Primary Examiner* — Richemond Dorvil
*Assistant Examiner* — Nadira Sultana
(74) *Attorney, Agent, or Firm* — Finnegan, Henderson, Farabow, Garrett & Dunner, LLP

(57) ABSTRACT

Disclosed embodiments relate to extracting classification information from input text. Techniques can include obtaining input text, identifying a plurality of tokens in the input text, pre-training a machine learning model, determining tagging information of the plurality of tokens using a first classification layer of the machine learning model, pairing sequences of tokens using the tagging information associated with the plurality of tokens, wherein the paired sequences of tokens are determined by a second classification layer, determining one or more attribute classifiers to apply to the one or more paired sequences, wherein the attribute classifiers are determined by a third classification layer of the machine learning model, evaluating sentiments of the paired sequences, wherein the sentiments of the paired sequences are determined by a fourth classification layer of the language machine learning model, aggregating sentiments of the paired sequences associated with an attribute classifier, and storing the aggregated sentiments.

19 Claims, 13 Drawing Sheets

(51) Int. Cl.
  *G06N 5/04*   (2023.01)
  *G06N 20/00*  (2019.01)

(56) References Cited

U.S. PATENT DOCUMENTS

| | | | | |
|---|---|---|---|---|
| 10,354,009 | B2* | 7/2019 | Liang | G06F 16/35 |
| 10,409,911 | B2* | 9/2019 | Goyal | G06F 40/205 |
| 11,586,828 | B2* | 2/2023 | Lev-Tov | G06F 40/30 |
| 2020/0349229 | A1* | 11/2020 | Abudalfa | G06F 40/30 |
| 2021/0357591 | A1* | 11/2021 | Campos Ortega | G06F 40/103 |

FOREIGN PATENT DOCUMENTS

| | | | | |
|---|---|---|---|---|
| JP | 2018-73343 A | | 5/2018 | |
| WO | WO-2019001458 A1 | * | 1/2019 | G10L 15/26 |

OTHER PUBLICATIONS

Ziwen Wang, Haiming Wu, Han Liu, Qian-Hua Cai, Bert-Pair Networks For Sentiment Classification, International Conference on Machine Learning and Cybernetics (ICMLC), Dec. 2020 (Year: 2020).*

Cecilia Ovesdotter Alm, Dan Roth, Richard Sproat, Emotions from text: machine learning for text-based emotion prediction, Proceedings of Human Language Technology Conference and Conference on Empirical Methods in Natural Language Processing (HLT/EMNLP), pp. 579-586, Vancouver, Oct. 2005. (Year: 2005).*

Jo[18]ao Paulo Aires, Carlos Padilhay, Christian Quevedoz, Felipe Meneguzzi, A Deep Learning Approach to Classify Aspect-Level Sentiment using Small Datasets, International Joint Conference on Neural Networks (IJCNN), 2018 (Year: 2018).*

PCT Notification of Transmittal, International Search Report, and Written Opinion, corresponding with the PCT Application No. PCT/JP2021/044874, mailed Feb. 22, 2022. (8 pages).

Miao et al., "Snippext: Semi-supervised Opinion Mining with Augmented Data," 2020 IW3C2 (International World Wide Web Conference Committee), published under Creative Commons CC-BY 4.0 License. ACM ISBN 978-1-4503-7023-3/20/04(12 pages).

* cited by examiner

| Operator | Description |
|---|---|
| TR | Replace non-target token with a new token. |
| INS | Insert before or after a non-target token with a new token. |
| DEL | Delete a non-target token. |
| SW | Swap two non-target tokens. |
| SPR | Replace a target span with a new span. |

Fig. 5

SYSTEMS AND METHODS FOR SEMI-SUPERVISED EXTRACTION OF TEXT CLASSIFICATION INFORMATION

BACKGROUND

Implementing natural language processing systems that allow computers to respond to natural language input is a challenging task. The task becomes increasingly difficult when machines attempt to understand expressed opinions in input text and extract classification information based on limited training data. There is a need for techniques and systems that can respond to the needs of modern natural language systems in a time and cost-effective manner.

SUMMARY

Certain embodiments of the present disclosure relate to a non-transitory computer readable storage medium storing instructions that are executable by a text classification system that includes one or more processors to cause the text classification system to perform a method for extracting classification information. The method can include obtaining input text, identifying a plurality of tokens in the input text, pre-training a machine learning model by: accessing an opinion phrase from the set of labeled data, generating a first set of opinion phrases using the opinion phrase, interpolating a second set of opinion phrases using the first set of opinion phrases as input, storing the first and second set of opinion phrases, and providing the first and second set of opinion phrases as input for training the machine learning model, determining tagging information of the plurality of tokens using a first classification layer of the machine learning model, pairing sequences of tokens using the tagging information associated with the plurality of tokens, wherein the paired sequences of tokens are determined by a second classification layer of the machine learning model, determining one or more attribute classifiers to apply to the one or more paired sequences, wherein the attribute classifiers are determined by a third classification layer of the machine learning model, evaluating sentiments of the paired sequences, wherein the sentiments of the paired sequences are determined by a fourth classification layer of the language machine learning model, aggregating sentiments of the paired sequences associated with an attribute classifier of the one or more attribute classifiers, and storing the aggregated sentiments of each attribute classifier and the one or more attribute classifiers.

According to some disclosed embodiments, generating a first set of opinion phrases using the opinion phrase can further include generating one or more updated tokens of a set of tokens obtained from the opinion phrase, and including the one or more updated tokens in the opinion phrase to generate the first set of opinion phrases.

According to some disclosed embodiments, including the one or more updated tokens in the opinion phrase to generate the first set of opinion phrases can further include identifying a set of non-target tokens of the opinion phrase, and replacing one or more non-target tokens of the set of non-target tokens of the opinion phrase with the updated tokens to generate the first set of opinion phrases.

According to some disclosed embodiments, replacing the one or more non-target tokens can further include sampling and selecting the one or more non-target tokens from the set of non-target tokens of the opinion phrase.

According to some disclosed embodiments, sampling and selecting the one or more non-target tokens can include uniform sampling, weight-based sampling, vector similarity sampling.

According to some disclosed embodiments, replacing one or more non-target tokens can further include replacement, insertion, deletion, swap the one or more non-target tokens and the updated tokens.

According to some disclosed embodiments, non-target tokens can include at least one of words, phrases, or punctuation marks of the input text.

According to some disclosed embodiments, interpolation of a second set of opinion phrases using the first set of opinion phrases can further include generating a second opinion phrase from the opinion phrase using a data augmentation operator, generating vectors of the opinion phrase and the second opinion phrase, and interpolating the vectors of the opinion phrase and the second opinion phrase.

According to some disclosed embodiments, generating a first set of opinion phrases can further include replacement of a span in the opinion phrase, and storing the updated opinion phrase with the replaced span.

According to some disclosed embodiments, replacement of a span can further include replacement of one or more target tokens.

According to some disclosed embodiments, pairing sequences of tokens using the tagging information associated with the plurality of tokens can further include identifying a plurality of target tokens of the plurality of tokens of the input text, and generating one or more tuples of target tokens each comprising two target tokens.

According to some disclosed embodiments, first element of the one or more tuples can be an aspect.

According to some disclosed embodiments, the second element of the one or more tuples can be an opinion expression.

According to some disclosed embodiments, sentiments of the paired sequences can be one of positive, negative, or neutral.

According to some disclosed embodiments, extracting classification information can further include obtaining unlabeled input text, generating one or more variants of the unlabeled input text using a data augmentation operator, generating one or more soft labels of one for each of the one or more variants of the unlabeled input text, wherein one or more soft labels are generated using a language machine learning model, and mapping using a map operator generated one or more soft labels to a 1-hot label.

According to some disclosed embodiments, extracting classification information can further include determining a soft label of the unlabeled input text using the language machine learning model, interpolating one or more labels between the soft label of the unlabeled input text and the one or more soft labels of the one or more variants of the unlabeled input text, and enforcing a machine learning model to create a smooth transition between the interpolated one or more labels.

Certain embodiments of the present disclosure relate to computer implemented method for extracting text classification information. The method can include obtaining input text, identifying a plurality of tokens in the input text, pre-training a machine learning model by: accessing an opinion phrase from the set of labeled data, generating a first set of opinion phrases using the opinion phrase, interpolating a second set of opinion phrases using the first set of opinion phrases as input, storing the first and second set of opinion phrases, and providing the first and second set of opinion phrases as input for training the machine learning model, determining tagging information of the plurality of tokens using a first classification layer of the machine learning model, pairing sequences of tokens using the tagging information associated with the plurality of tokens, wherein the paired sequences of tokens are determined by a second classification layer of the machine learning model, determining one or more attribute classifiers to apply to the one or more paired sequences, wherein the attribute classifiers are determined by a third classification layer of the machine learning model, evaluating sentiments of the paired sequences, wherein the sentiments of the paired sequences are determined by a fourth classification layer of the language machine learning model, aggregating sentiments of the paired sequences associated with an attribute classifier of the one or more attribute classifiers, and storing the aggregated sentiments of each attribute classifier and the one or more attribute classifiers.

According to some disclosed embodiments, generating a first set of opinion phrases can further include accessing an opinion phrase from the set of labeled data, generating one or more updated tokens of a set of tokens obtained from the opinion phrase, and including the one or more updated tokens in the opinion phrase to generate the first set of opinion phrases.

According to some disclosed embodiments, interpolation of a second set of opinion phrases using the first set of opinion phrases can further include generating a second opinion phrase from the opinion phrase using a data augmentation operator, generating vectors of the opinion phrase and the second opinion phrase, and interpolating the vectors of the opinion phrase and the second opinion phrase.

Certain embodiments of the present disclosure relate to a text classification system. The text classification system can include one or more memory devices storing processor executable instructions, and one or more processors configured to execute the instructions to cause the text classification system to perform operations. The operations can include obtaining input text, identifying a plurality of tokens in the input text, pre-training a machine learning model by: accessing an opinion phrase from the set of labeled data, generating a first set of opinion phrases using the opinion phrase, interpolating a second set of opinion phrases using the first set of opinion phrases as input, storing the first and second set of opinion phrases, and providing the first and second set of opinion phrases as input for training the machine learning model, determining tagging information of the plurality of tokens using a first classification layer of the machine learning model, pairing sequences of tokens using the tagging information associated with the plurality of tokens, wherein the paired sequences of tokens are determined by a second classification layer of the machine learning model, determining one or more attribute classifiers to apply to the one or more paired sequences, wherein the attribute classifiers are determined by a third classification layer of the machine learning model, evaluating sentiments of the paired sequences, wherein the sentiments of the paired sequences are determined by a fourth classification layer of the language machine learning model, aggregating sentiments of the paired sequences associated with an attribute classifier of the one or more attribute classifiers, and storing the aggregated sentiments of each attribute classifier and the one or more attribute classifiers.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5 shows an exemplary table of data augmentation operators, consistent with embodiments of the present disclosure.

DETAILED DESCRIPTION

Figure 1:
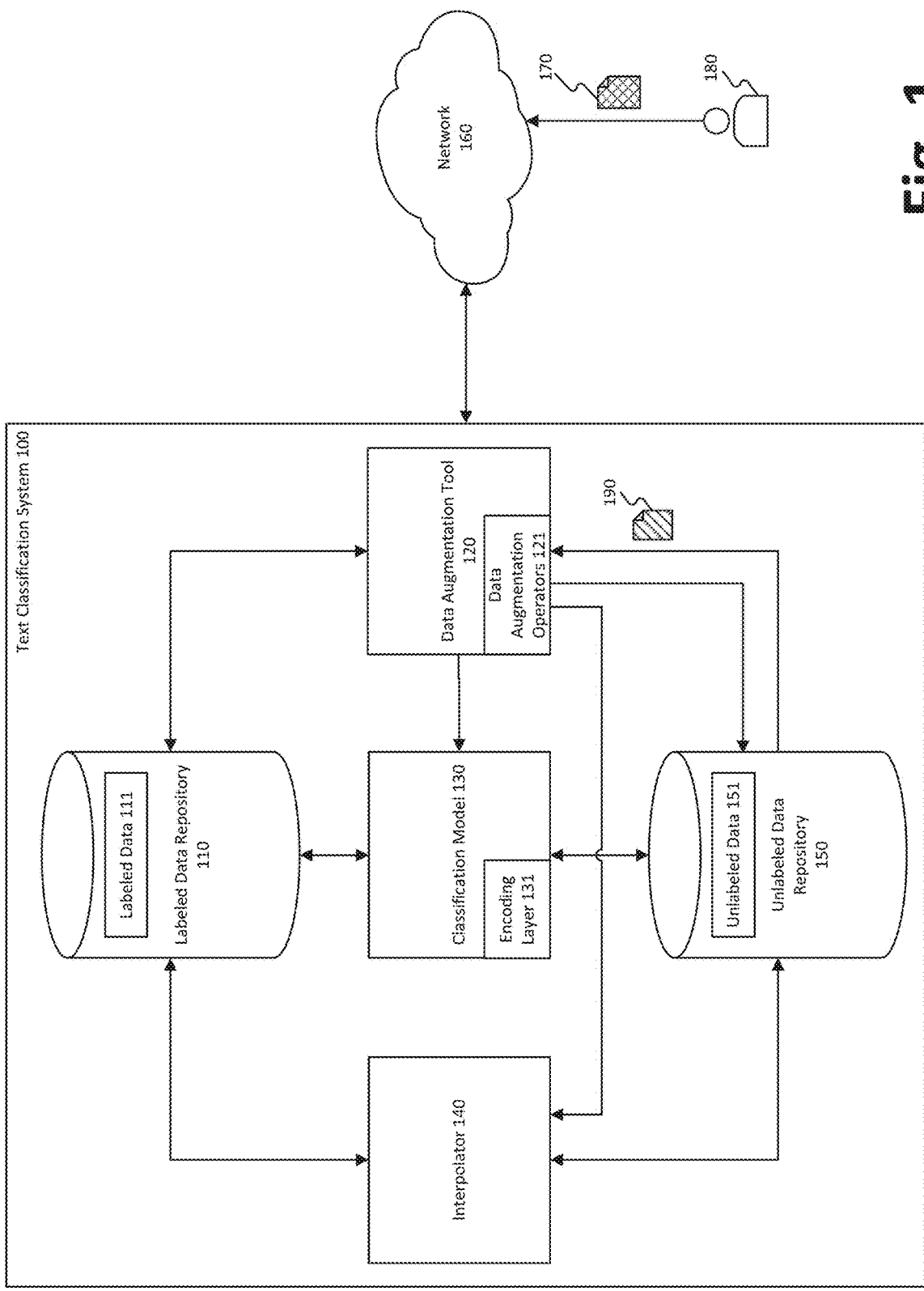
FIG. 1 is a block diagram showing exemplary components of a text classification system, consistent with embodiments of the present disclosure.

In the following detailed description, numerous details are set forth to provide a thorough understanding of the disclosed example embodiments. It is understood by those skilled in the art that the principles of the example embodiments can be practiced without every specific detail. The embodiments disclosed are exemplary and are not intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for mining opinions to extract classification information based on limited training data using natural language techniques by computing systems.

The described embodiments provide a distinct advantage over existing techniques of natural language processing. Unlike other processes, the data augmentation and interpolation techniques described in the disclosed embodiments can operate in a semi-supervised manner. Additionally, the described embodiments can extract classification information with small amounts of training data, which provides distinct advantages over current customized neural networks designed for opinion mining. By generating additional training data both from existing labeled data and from unlabeled data, the embodiments disclosed herein can effectively mine for opinions to extract classification information in a semi-supervised manner. This can provide significant advantages in natural language processing systems that may need to respond to different individuals or questions that often say the same thing but in different ways. By allowing for semi-supervised, efficient extraction of classification information, the embodiments disclosed herein can provide an improved ability to use natural language processing in various industries and particularized contexts without the need for a time-consuming and expensive pre-training process.

FIG. 1 is a block diagram showing various exemplary components of a text classification system 100 for extracting classification information from a given input text, consistent with embodiments of the present disclosure. The text classification system 100 can comprise a labeled data repository 110 that can be pre-populated using a corpus of sentences. In some embodiments, the labeled data repository 110 saves a set of input sentences supplied by a user before passing them to other components of text classification system 100. In other embodiments, the sentences in the labeled data repository 110 can be supplied by a separate system. In some embodiments, labeled data repository 110 can include sentences supplied by user input, other systems, other data sources, or feedback from text classification system 100 or its components. Labeled data repository 110 can be a Relational Database Management System (RDBMS) (e.g., Oracle Database, Microsoft SQL Server, MySQL, PostgreSQL, or IBM DB2). An RDBMS can be designed to efficiently return data for an entire row, or record, from the database in as few operations as possible. An RDBMS can store data by serializing each row of data in a data structure. In an RDBMS, data associated with a record can be stored serially such that data associated with all categories of the record can be accessed in one operation. Moreover, an RDBMS can efficiently allow access to related records stored in disparate tables. For example, in an RDBMS, tables can be linked by a referential column, and the RDBMS can join tables together to retrieve data for a data structure. In some embodiments, the labeled data repository 110 can be a non-relational database system (NRDBMS) (e.g., XML, Cassandra, CouchDB, MongoDB, Oracle NoSQL Database, FoundationDB, or Redis). A non-relational database system can store data using a variety of data structures such as, among others, a key-value store, a document store, a graph, and a tuple store. For example, a non-relational database using a document store could combine all of the data associated with a particular identifier into a single document encoded using XML. The labeled data repository 110 can also be an in-memory database such as Memcached. In some embodiments, the contents of labeled data repository 110 can exist both in a persistent storage database and in an in-memory database, such as is possible in Redis.

In natural language processing systems, such as text classification system 100, opinions can be conveyed using different words or groupings of words that have a similar meaning. Text classification system 100 can identify the opinions in the input sentences using a semi-supervised system and extract classification information accordingly. Text classification system 100 can extract classification information by pre-training the classification model 130 using limited training data in labeled data repository 110, as described below. Using the labeled data 111 in labeled data repository 110, text classification system 100 can generate additional data (e.g., using data augmentation tool 120 and interpolator 140, described in more detail below) to generate multiple phrases conveying related opinions. The generated phrases can be used to create new sentences. The phrases themselves can be complete sentences.

By generating additional phrases in this way, text classification system 100 can extract classification information in a cost-effective and efficient manner. Moreover, the text classification system 100, outlined above, and described in more detail below, can generate additional data from the labeled data 111 that can otherwise be considered too small for use in existing systems and unlabeled data 151 that be considered unusable by current systems.

As illustrated in FIG. 1, text classification system 100 can include components such as data augmentation tool 120, classification model 130, and interpolator 140. Text classification system 100 can also include data stores such as labeled data repository 110 and unlabeled data repository 150. Text classification system 100 can use data stored in both labeled data repository 110 and unlabeled data repository 150 as input to train classification model 130 to improve the extraction of classification information from an input sentence. Text classification system 100 can use data augmentation tool 120 and interpolator 140 to generate additional data to train classification model 130 to improve extraction of classification information from an input sentence. Classification model 130 is a machine learning model and can include a plurality of layers. The plurality of layers can include fully connected layers or partially connected layers. Classification model 130 can transform the data in labeled data repository 110, and unlabeled data repository 150 before the data is used by data augmentation tool 120 and interpolator 140. Classification model 130 can use encoding layer 131 to transform the data in labeled data repository 110 and unlabeled data repository 150. In some embodiments, classification model 130 can be pre-trained. Transformation of data in labeled data repository 110 and unlabeled data repository 150 is discussed in detail in the FIG. 4 description below. Text classification system 100 can receive requests for extracting classification information over network 160. Network 160 can be a local network or internet or a cloud. User 180 can send requests for extracting classification information to text classification system 100 over network 160. User 180 can interact with text classification system 100 over a tablet, laptop or a portable computer using a web browser or an installed application. User 180 sends input sentence 170 over network 160 to text classification system 100 for extracting classification information Data augmentation tool 120 can process data in labeled data repository 110 to generate additional labeled data by updating one or more portions of existing text sentences. In some embodiments, data augmentation tool 120 receives some or all of the sentences directly as input instead of loading them from labeled data repository 110.

Data augmentation tool 120 can select portions of sentences, for example, opinion phrases, present in labeled data repository 110 based on predefined criteria to apply data augmentation techniques for generating additional data. In some embodiments, data augmentation tool 120 can also select sentences based on predefined criteria. Data augmentation tool 120 can supply the selected sentences to classification model 130 and interpolator 140. The predefined criteria can include metadata about the data in the labeled data repository 110 such as sentences shorter than a certain length, language, or other content related criteria such as subject matter of input sentence 170 or the selected sentences in labeled data repository 110. The predefined criteria can also be based on user 180 of text classification system 100 or individuals or parties who prepared and stored selected sentences in labeled data repository 110. The length can be determined by the number of characters, words, or phrases. In some embodiments, the length can be determined by the amount of screen space taken to present the sentence. In some embodiments, the predefined criteria can vary with the language of input sentence 170. The text classification system 100 can be configured to accept sentences in one or more languages or include content in one or more subject areas. The configuration may allow selection of sentences in labeled data repository 110 that match the language or subject matter of input sentence 170. The predefined criteria can be set utilizing a graphical user interface. The predefined criteria can be set individually by each user of the system or by the administration of text classification system 100. The predefined criteria can be automatically determined based on the sentence's corpus or the language of the sentences present in labeled data repository 110.

Data augmentation tool 120 can store the additional data (e.g., in the form of sentences) in labeled data repository 110 for later use. In some embodiments, the additional data is temporarily stored in memory and supplied to classification model 130 and interpolator 140 to generate further additional data for training. Labeled data repository 110 can receive and store the additional data generated by data augmentation tool 120.

Data augmentation tool 120 can select different data augmentation operators to apply to input data selected from labeled data repository 110 to generate additional data. The data augmentation tool 120 can select a different data augmentation operator for each input data sentence. Data augmentation tool 120 can also select data augmentation operators based on predefined criteria or in a random manner. In some embodiments, data augmentation tool 120 can apply the same data augmentation operator for a set of sentences or a set time period.

Data augmentation tool 120 can preprocess the input data to identify opinion phrases in the sentences of input data 190 selected from the labeled data repository 110 as part of applying data augmentation operators 121 to input data 190. Data augmentation tool 120 can select one or more data augmentation operators 121. Data augmentation tool 120 can apply selected data augmentation operators 121 to opinion phrases identified in a sentence to generate updated phrases. In some embodiments, generating updated phrases can include updating one or more words in the sentence of input data. The process of generating updated phrases is discussed in detail in FIG. 3A description below.

Data augmentation tool 120 can use the updated phrases to generate additional data. Data augmentation tool 120 can generate additional data by including the updated phrase in the sentence with the identified opinion phrase. Data augmentation tool 120 can update the sentence by replacing the phrase identified in the sentence or appending it. In some embodiments, the data augmentation tool 120 can swap identified opinion phrases' position before replacing one or all opinion phrases with updated phrases. Examples of various data augmentation operators 121 available in text classification system 100 are described in the FIG. 5 description below.

In some embodiments, the additional data generated by data augmentation tool 120 using updated phrases can include information about the opinion phrases. The information about the opinion phrases can include the position of the updated phrases in the original sentence and metadata such as, for example, the text of the original and updated phrases. All information or metadata related to updated phrases can be sent to labeled data repository 110 for storage along with the new sentences generated as part of additional data to train the machine learning model (e.g., classification model 130) of text classification system 100.

Classification model 130 is a machine learning (ML) model that can aid in the extraction of classification information of an input sentence and provide transformed data used by both data augmentation tool 120 and interpolator 140. Classification model 130 can include an encoding layer 131 to transform the data obtained from labeled data repository 110 and unlabeled data repository 150. Classification model 130 can be a modified neural network architecture such as, for example, BERT, ELMO, etc. Transformation of data using classification model 130 is described in detail in the FIG. 4 description below. Classification layers of classification model 130 used to extract classification information are discussed in the FIG. 3A description below.

The text classification system 100 can also include interpolator 140 to generate additional data utilized in training classification model 130. Interpolator 140 can interpolate additional input sentences between the sentences of input data 190 selected from the labeled data repository 110 by data augmentation tool 120 and the additional sentences data generated by data augmentation tool 120. In some embodiments, interpolator 140 can also interpolate between input sentences previously stored in labeled data repository 110. In some embodiments, interpolator 140 can interpolate between opinion phrases in an input sentence identified by data augmentation tool 120.

Interpolator 140 can interpolate opinion phrases between phrases in the input sentence and the updated phrases generated using the data augmentation tool 120. In some embodiments, interpolator 140 can interpolate between updated phrases generated using different data augmentation operators 121 applied to the same input sentence. Interpolator 140 can be an additional layer in classification model 130. Interpolator 140 can utilize convex interpolation technique to interpolate between two sentences in text format. Interpolator 140 can apply the convex interpolation technique on two sentences in their vector format. Interpolator 140, using a convex interpolation technique, can first sample an interpolation parameter (e.g., a real value between 0 and 1) from a Beta distribution. Interpolator 140 can then use the sample of interpolation parameter representing a factor to interpolate two vectors. The sentences input to interpolator 140 can be converted to their vector format using an encoding layer of a language model, such as BERT. In some embodiments, classification model 130 can include a layer to help transform sentences to vector format. Interpolator 140 can only transform certain phrases in input sentences to vector format before applying the convex interpolation technique. Interpolator 140 can update input sentences with interpolated phrases obtained by interpolating between phrases identified in input sentences.

Text classification system 100 can also include unlabeled data repository 150 for storing unlabeled data. Unlabeled data can include unannotated data (e.g., data that has not been labeled or annotated by a human or other process). As described above in reference to labeled data repository 110, Unlabeled data repository 150 can be an RDBMS, an NRDBMS, or other types of data store. In some embodiments, the unlabeled data repository 150 can be stored on the same database as labeled data repository 110. Unlabeled data repository can provide a large quantity of data for training that is not annotated by humans or other processes making it difficult to use for supervised learning of a natural language processing system. Text classification system 100 can use encoding layer 131 and interpolator 140 to include unlabeled data as additional data for training classification model 130. Text classification system 100 can initially encode the unlabeled data in unlabeled data repository 150 and guess labels using MixMatch method adjusted for natural language processing. Text classification system 100 can connect the encoded unlabeled data with annotated guessed labels to additional data generated using data augmentation tool 120 and interpolator 140 by applying interpolation techniques to satisfy classification model 130 training data requirements. A detailed description of using unlabeled data repository 150 to generate additional data is presented in the FIG. 4 description below.

The components of text classification system 100 can run on a single computer or can be distributed across multiple computers or processors. The different components of text classification system 100 can communicate over a network (e.g., LAN or WAN) 160 or the Internet. In some embodiments, each component can run on multiple computer instances or processors. The instances of each component of the text classification system 100 can be a part of a connected network such as a cloud network (e.g., Amazon AWS, Microsoft Azure, Google Cloud). In some embodiments, some, or all, of the components of text classification system 100 are executed in virtualized environments such as a hypervisor or virtual machine.

Figure 2B:
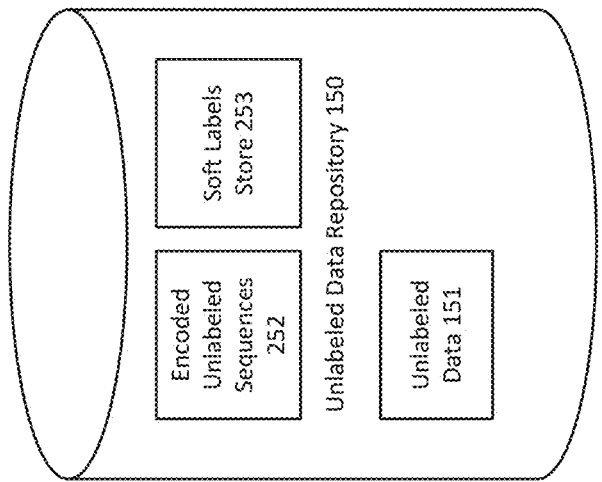
FIGS. 2A-B shows exemplary data repositories utilized by the text classification system of FIG. 1, consistent with embodiments of the present disclosure.
Figure 2A:
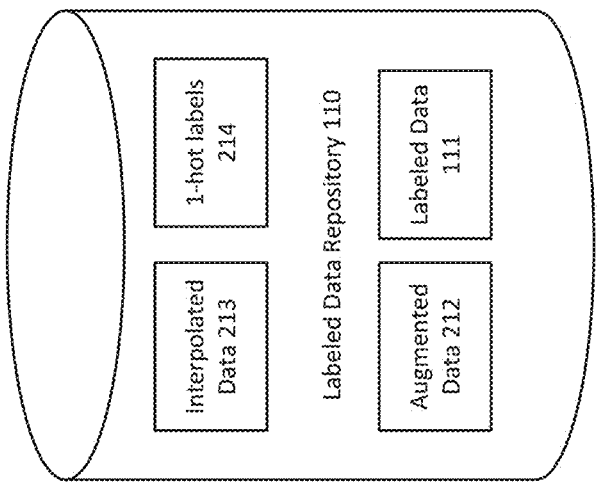

FIGS. 2A-B show exemplary contents of data repositories (e.g., labeled data repository 110 and unlabeled data repository 150) utilized by the text classification system 100 for training its machine learning classification model (e.g., classification model 130), consistent with embodiments of the present disclosure.

As shown in FIG. 2A, labeled data repository 110 can include labeled data 111, augmented data 212, interpolated data 213, and 1-hot labels 214. Labeled data repository 110 can store data (such as labeled data 111, augmented data 212, interpolated data 213) and associated annotations (e.g., 1-hot labels 214) in separate databases. In some embodiments, labeled data 111, augmented data 212, and interpolated data 213 can also be in separate databases. In some embodiments, labeled data 111, augmented data 212, and interpolated data 213 can be part of the same database in different tables. Annotations (e.g., 1-hot labels 214) of these different data can also be in the same database along with the data. In some embodiments, labeled data repository 110 can store additional types of data not shown in FIG. 2A.

Augmented data 212 can include additional data (e.g., updated phrases and sentences) generated by data augmentation tool 120 of FIG. 1, using the labeled data 111. Labeled data repository 110 can include relationships between labeled data 111 and augmented data 212. The relationships between the labeled data 111 and augmented data 212 can be stored as additional data in the labeled data repository 110. Labeled data repository 110 can include relationships between labeled data 111 and augmented data 212 in different formats based on the type of database storing the data. For example, primary and foreign keys in a relational database (e.g., MySQL, Postgres, Oracle, etc.) can indicate the relationship between database tables holding labeled data 111 and augmented data 212. In some embodiments, the relationship can be a separate data structure (such as database tables) and can include additional relationship information. Additional relationship information can include the position of differences in sentences in labeled data 111 and augmented data 212 and the different phrases in the sentences causing the differences.

Interpolated data 213 can include additional data generated by interpolator 140 using labeled data 111 and augmented data 212. Labeled data repository 110 can also include relationship information between interpolated data 213 and labeled data 111 and augmented data 212. The relationship information can include which sentences in the interpolated data 213 are generated from a pair of sentences in labeled data 111 and augmented data 212. The relationship information can include additional information such as differences or the amount of difference between original sentence in the labeled data 111 and the new sentences created using updated phrases in augmented data 212. The amount of difference between original and new sentences can be based on the difficulty level of interpolation between two sets of sentences. In some embodiments, a higher amount of difference can indicate that the new sentences are too far from the opinion conveyed in the original sentences and should be ignored.

Labeled data repository 110 can also include 1-hot labels 214 that annotate the additional data (e.g., augmented data 212) generated using data augmentation tool 120 and interpolator 140. The labels used for annotating the augmented data 212 can be a copy of the labels used for related sentences in labeled data 111. In some embodiments, the labels can be determined based on the attributes associated with the sentences in the labeled data 111 and augmented data 212 as described in detail in the FIG. 4 description below.

As described in relation to FIG. 1, text classification system 100 can also include an unlabeled data repository 150 for using a semi-supervised learning technique to train the classification model. The limited availability of labeled data can be addressed by utilizing unlabeled data 151 in unlabeled data repository 150. As shown in FIG. 2B, unlabeled data repository 150 can also include encoded sequences of unlabeled data 151 as encoded unlabeled sequences 252. Encoded unlabeled sequences 252 can be generated using encoding layer 131 of classification model 130. Encoded sequences of unlabeled data 151 can help in integrating both additional data generated from unlabeled data 151 and labeled data 111. In addition to the unlabeled data 151 and their encoded unlabeled sequences 252, unlabeled data repository 150 can also include soft labels store 253. Soft labels store 253 can be generated by classification model 130 using unlabeled data 151. A process of generating and associating soft labels to the unlabeled data 151 is described further in the FIG. 4 description below.

Figure 3A:
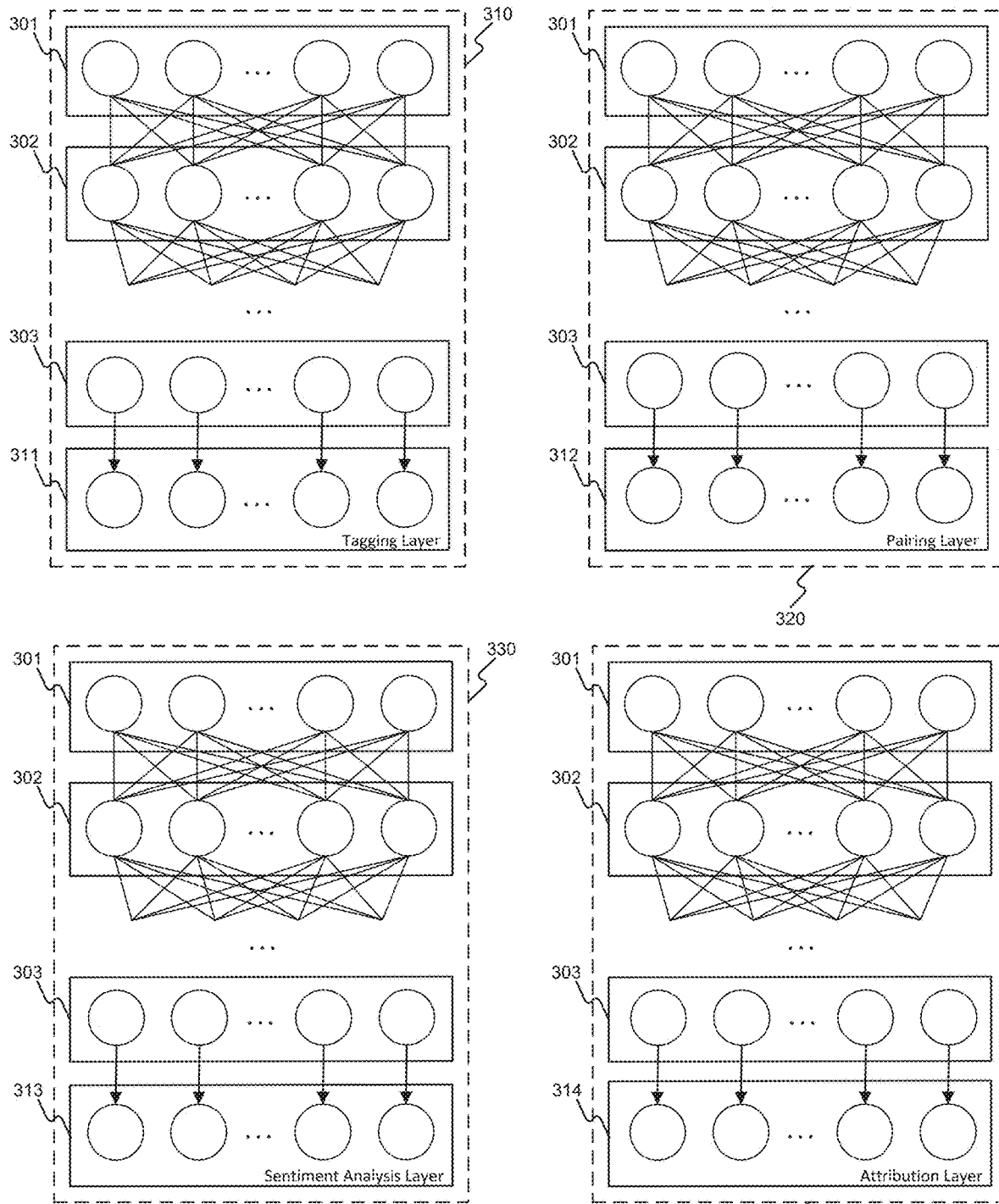
FIG. 3A shows exemplary classification models for extracting classification information, consistent with embodiments of the present disclosure.

FIG. 3A shows exemplary classification models 310, 320, 330, and 340 for extracting classification information from an input sentence, consistent with embodiments of the present disclosure. Classification models 310, 320, 330, and 340 can be variations of classification model 130 with different classification layers 311-314. Classification models 310, 320, 330, and 340 include multiple layers 301-303 to process the input data before extracting classification information using classification layers 311-314. Classification layers 311-314 can include specialized layers such as tagging layer 311, pairing layer 312, attribution layer 313, and sentiment analysis layer 314. Each layer in classification layers 311-314 can be a fully connected layer. In some embodiments, some or all of the classification layers 311-314 can be partially connected layers. Classification models 310, 320, 330, and 340 can be a modified version of a standard language model such as BERT.

Classification models 310, 320, 330, and 340 layers can include embedding layer 301, transformer layer 302, and output layer 303. Embedding layer 301 can aid in encoding input sentence (e.g., input sentence 170 of FIG. 1) before supplying to transformer layer 302. The embedding layer 301 can generate multiple encodings, including the meaning of each word and each word's position in a sentence. Transformer layer 302 can transform the input data into a different representation. For example, transformer layer 302 can translate input sentence 170 from French to English before further processing. In some embodiments, transformer layer 302 can transform the sentence structure from a string to a vector. Classification models 310, 320, 330, and 340 can include more than one transformer layer 302 for applying similar or different transformations to input provided to classification models 310, 320, 330, and 340. Output layer 303 can help generate an output format required to store the output, present it to a user (e.g., user 180), or supplied as input to other software tools, including classification models 310, 320, 330, and 340.

Classification models 310, 320, 330, and 340 supply the output of output layer 303 to classification layers 311-314 in various embodiments of classification model 130. Classification models 310, 320, 330, and 340 can include a different number of nodes in layers 301-303. Classification models 310, 320, 330, and 340 can also include a different number of layers for processing input sentence (e.g., input sentence 170) before supplying to classification layers 311-314. In some embodiments, classification layers 311-314 of classification models 310, 320, 330, and 340 can also include a different number of nodes for processing input sentences and extracting classification information. Each node in layers of classification models 310, 320, 330, and 340 can represent a software program function or the whole software program(s). A processor (e.g., CPU 620 of FIG. 6 described below) can execute software functions and programs representing one or more nodes of a layer in a classification model. The processor can be a virtual or physical processor of a computing device. Computing devices executing the software functions or programs can include a single processor or core or multiple processors or cores or can be multiple computing devices spread across a distributed computing environment, network, cloud, or virtualized computing environment. In some embodiments, the number of nodes of a layer of classification models 310, 320, 330, and 340 can be dynamically determined based on input to a classification model (e.g., one of classification models 310, 320, 330, and 340). Classification models 310, 320, 330, and 340 output generated by classification layers 311-314 can be stored in storage 628 as described in FIG. 6 below. Classification models 310, 320, 330, and 340 input can include output generated by classification layers 311-314. Classification models 310, 320, 330, and 340 can connect directly to each other to receive input classification information output extracted by classification layers 311-314. In some embodiments, classification models 310, 320, 330, and 340 can access output from classification layers 311-314 from storage 628 (shown in FIG. 6 below). Classification layers 311-314 are discussed in detail below.

Tagging layer 311 of classification model 310 can identify different parts of an input sentence. The identification process can include identifying target tokens that are useful in classification or non-target tokens that can be replaced without affecting the classification process. Non-target tokens can include articles, prepositions, and punctuation marks in an input sentence. For example, an input sentence "The room was average." includes non-target tokens "The," "was," and the period symbol and target tokens "room" and "average."

In some embodiments, target tokens identified by tagging layer 311 can include different types of target tokens and can be tagged with different tags. For example, an input sentence can include a target token of a subject being described called an aspect, and a description of the subject called an opinion phrase. In an input sentence, "The room was average," the "room" is the subject being described, and the description is "average." Tagging layer 311 can tag "room" and "average" which represent a subject and the subject's description as target tokens and can include additional tags aspect and opinion phrase, respectively. The opinion phrase tag identifies the opinion conveyed in the subject's description. The words "The," "was," and period symbol can be labeled by tagging layer 311 as non-target tokens. Tagging layer 311 can determine the tokens (both target and non-target) in an input sentence by splitting an input sentence along words separated by a space. Tagging layer 311 can determine tags using a process that includes the identification of different phrases within a sentence and separators between those phrases. For example, in an input sentence, "The rooms were average, but the breakfast was amazing," has two phrases "The rooms were average" and "the breakfast was amazing." The two phrases can be identified by identification of separators in the input sentence. The identified separators by the tagging layer 311 can include both spaces between words in the input sentence, the comma punctuation mark, and the prepositions (e.g., 'but' in the above sentence) between the phrases. The classification model 130 can understand the structure of the natural languages to determine phrases within the input sentence. Tagging layer 311 can seek help from other language model standard layers present in a classification model 310 to make such determination of tokens and tagging the determined tokens.

Pairing layer 312 of classification model 320 can help pair a set of related tokens identified by tagging layer 311. In some embodiments, pairing layer 312 functionality can be part of the tagging layer 311. Pairing layer 312 can pair related target tokens identified by tagging layer 311. The relationship between target tokens in an input sentence can be based on its subject and its subject's description as identified by the tagging layer 311. In some embodiments, a sequence of tokens can be grouped together as subject or a description of that subject. For example, in an input sentence, "The Chinese cuisine at the restaurant is average at best," the subject identified by tagging layer 311 will be a sequence of tokens, ("Chinese," "cuisine," "restaurant") and ("restaurant"), the description can also be a sequence of tokens ("average," "at best"). In some embodiments, tokens representing a description can be associated with tokens representing multiple subjects and vice versa. In the above example, both sequences of tokens ("Chinese," "cuisine," "restaurant") and ("restaurant") can be associated with ("average," "at best"). Similarly, an input sentence, "Room was smelly and noisy" processed by tagging layer 311 and pairing layer 312 can result in subject target token, "room," associated with multiple description target tokens, "smelly" and "noisy."

Attribution layer 313 of classification model 330 can associate attributes to the identified sequence of tokens representing a subject. The attributes can be selected from a close set of attributes pre-selected by the user of the system. In some embodiments, the attributes can be industry specific, with a standard set of attributes that can be publicly available are distributed by certain groups. Different subject target tokens identified in the input sentence can be associated with the same attribute. For example, in the previously mentioned input sentence, "The room was average, but the breakfast was amazing," the two subject target tokens, "room" and "breakfast," as identified by tagging layer 311 can be associated with a single attribute of "Hotel."

A sentiment analysis layer 314 of classification model 340 can evaluate sentiment in the description target token identified by tagging layer 311. Sentiment analysis layer 314 can evaluate the positive, negative, or neutral tone of the opinion presented in the description target token of the identified subject target token in the tagging layer 311. When evaluating sentiment, sentiment analysis layer 314 can set a value of −1, +1, or 0 for the identified negative, positive, or neutral tone in the description. The tone of the description can also depend on the subject target token identified by tagging layer 311 and paired with a description target token by pairing layer 312. For example, input sentences, "Hotel room has thin walls" and "Low-cost houses involve thin walls," both include the description, "thin walls," but are associated with subjects, "hotel room" and "low-cost houses," respectively. Accordingly, the subject target tokens can have different sentiment values. The "hotel rooms" walls being thin can indicate a lack of privacy, which can be a negative sentiment, but "low-cost houses" walls being thin can be a neutral statement. The sentiment analysis layer 314 can make this evaluation of what token represents the subject before calculating the sentiment. In some embodiments, sentiment analysis layer 314 can also rely on the attribute determined by the attribution layer for a sequence of tokens representing a subject.

Sentiment analysis layer 314 evaluated sentiment value set can also include more than three values (namely positive, negative, and neutral). For example, the sentiment values generated by sentiment analysis layer 314 can be a range of numbers from 0 to 10 or −5 to +5. In some embodiments, the sentiment values can be other custom defined set of values. For example, a customized class could include values, "bad," "average," "good," "better," or "best." In some embodiments, a user can configure text classification system 100 to set the class of sentiments. Sentiment analysis layer 314 can aggregate the sentiment values of one or more descriptions associated with a sequence of tokens. In some embodiments, sentiment analysis layer 314 can aggregate the evaluated sentiment values based on the attribute assigned by the attribution layer 313. For example, multiple sentiment values assigned to an attribute can be summed together as part of the attribution value. In some embodiments, the aggregation can include applying a weighting factor to each sentiment value, and the weight can be determined based on the subject token. In some embodiments, the weight factor applied to an aggregated sentiment value assigned to an attribute can depend on the user accessing the sentiment classification information.

The extracted classification information can include identifying target vs. non-target tokens, the pairing of sequences of related tokens, categories associated with the input data, and the sentiment values. A user of the text classification system 100 can request one or more different classification information available from different classification layers 311-314. In some embodiments, classification information to be extracted can be determined based on a user (e.g., user 180). For example, a user (e.g., user 180) can configure their preferences to only provide classification information related to identification of target tokens. The classification information to be extracted can be determined based on an input sentence (e.g., input sentence 170). The input sentence (e.g., input sentence 170) can include incomplete sentences or phrases (e.g., "The Best" or "Ok") which may not identify the subject or subject's description and accordingly restricting text classification system 100 from determining pairing classification information using pairing layer 312.

Figure 3B:
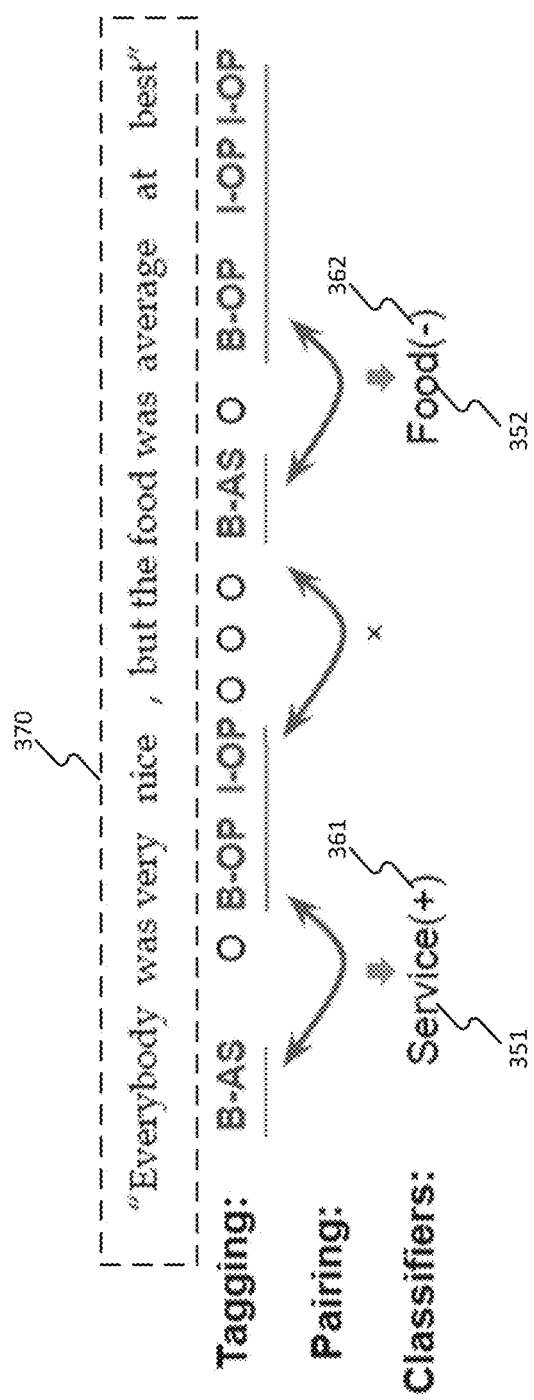
FIG. 3B shows exemplary functionality of classification layers of classification models, consistent with embodiments of the present disclosure.

FIG. 3B shows the functionality of classification layers 311-314 of classification models 310, 320, 330, and 340 of FIG. 3A, using an example input sentence, consistent with embodiments of the present disclosure. An example input sentence 370, ("Everybody was very nice, but the food was average at best"), can be supplied to the text classification system 100 for extracting classification information. As discussed above in FIG. 3A, Text classification system 100 can rely on variations of classification model 130 in particular classification layers 311-314 to help extract the classification information. As shown in FIG. 3B, the example input sentence 370 is processed by different classification layers 311-314 of classification models 310, 320, 330, and 340 to extract classification information (labeled as classifiers) showing attributes, "Service" 351 and "Food" 352, and their sentiment values "+" 361 and "−" 362 respectively.

Tagging layer 311 of classification model 310 of FIG. 3A can tag tokens identified in a sentence with various tags. As shown in FIG. 3B, in an example text classification system 100, every non-target token that does not represent the subject or the subject's description in an input sentence is tagged with an 'O' tag. Tagging layer 311 can tag target tokens for a subject and the subject's description differently. Further, subjects and subject descriptions with multiple tokens can use different tags for the beginning token in a sequence of tokens and the following tokens. For example, in the example input sentence 370, subject target tokens, ("everybody," and "food"), are tagged with 'B-AS' tags, and descriptions ("very nice," and "average at best") use 'B-OP' to mark the beginning of a sequence of tokens and 'I-OP' for the following tokens.

Pairing layer 312 of classification model 320 of FIG. 3A can go through various sequences of tokens to identify the target tokens representing the subject and the description of the subject to be paired. As shown in FIG. 3B, the pairing layer 312 identification of pairs of sequences of target tokens can be represented by arrows between the tags (B-AS, B-OP) associated with the subject and subject description target tokens. Some of the pairings can be incorrect and presented in FIG. 3B using the 'x' mark below the arrow, pairing the subject and description target tokens. Such incorrect pairings are not considered for determining the attribute associated with the paired sequences of tokens by the attribution layer 313.

The example input sentence 370 includes two example attributes, "Service" 351 and "Food" 352. The classification layers 311-314 can also evaluate the sentiments embedded in the example input sentence 370. Sentiment analysis layer 314 of classification model 340 of FIG. 3A can be used to determine sentiment associated with "Service" 351 attribute is positive and represented by the '+' 361 sign. Similarly, sentiment analysis layer 314 can be used to calculate the sentiment associated with other categories (e.g., "Food") in the input sentence 370. For example, the sentiment analysis layer 314 can evaluate sentiment associated with "Food" 362 attribute is negative and represented by the "–" 362 sign.

Figure 3C:
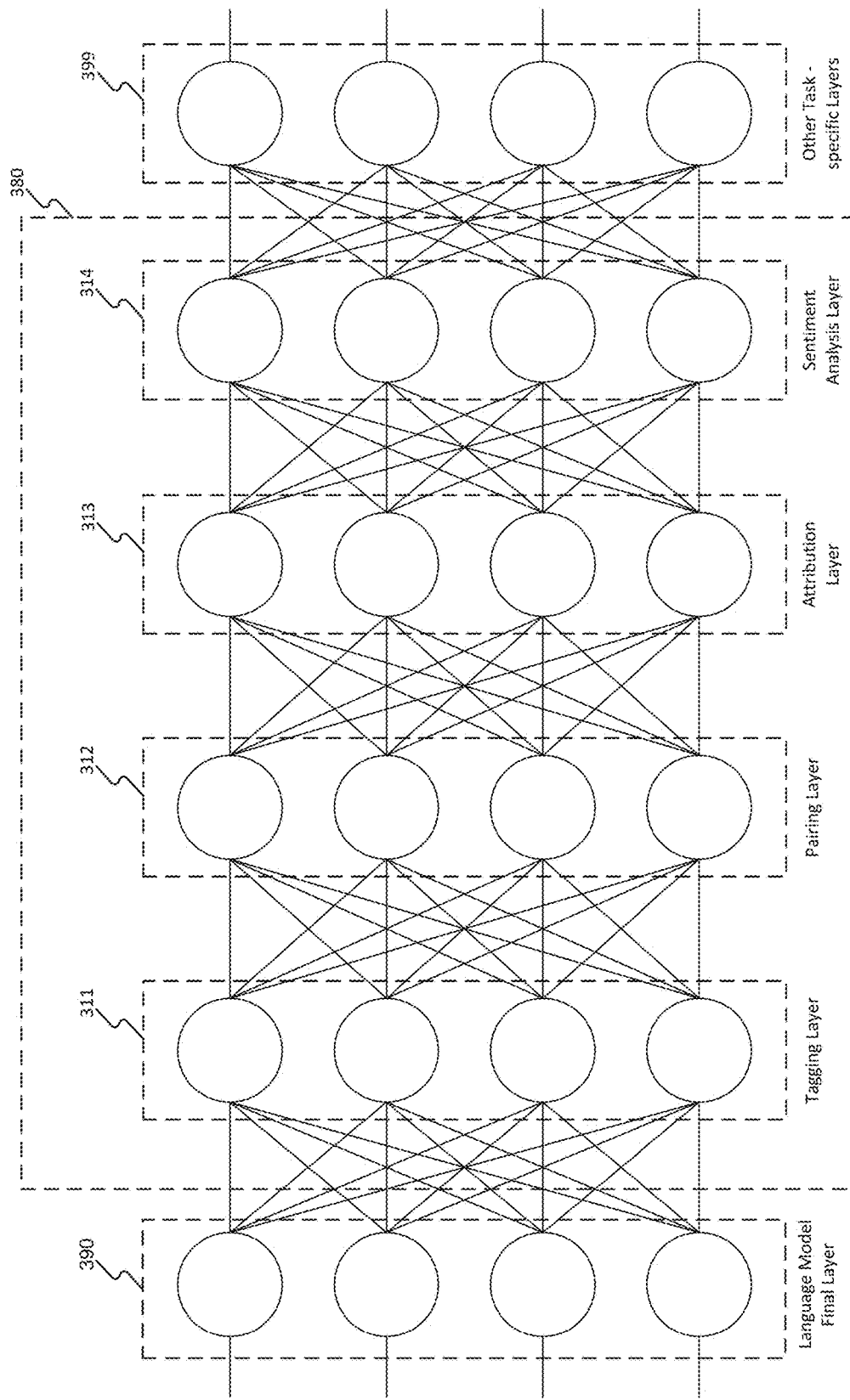
FIG. 3C shows exemplary classification models for extracting classification information, consistent with embodiments of the present disclosure.

FIG. 3C shows an exemplary embodiment of classification model 130 for extracting classification information, consistent with embodiments of the present disclosure. Classification model 130 of FIG. 1 can include classification layers 311-314 together in a single model as a set of classification layers 380 to help extract classification information from an input sentence. Classification layers 380 can include specialized layers such as tagging layer 311, pairing layer 312, attribution layer 313, and sentiment analysis layer 314. Each layer in classification layers 380 can be a fully connected layer. In some embodiments, some or all of the classification layers 380 can be partially connected layers. In some embodiments, a layer in classification layers 380 can perform tasks assigned to other specialized layers. Classification model 130 can be a modified version of a standard language model such as BERT. Classification model can be a modified language model with additional layers such as classification layers 380 added after language model final layer 390. In some embodiments, the classification model 130 can include additional other task-specific layers 399 after the classification layers 380. Classification layers 380 can perform tasks as described above in FIG. 3A description of classification layers 311-314.

Figure 4:
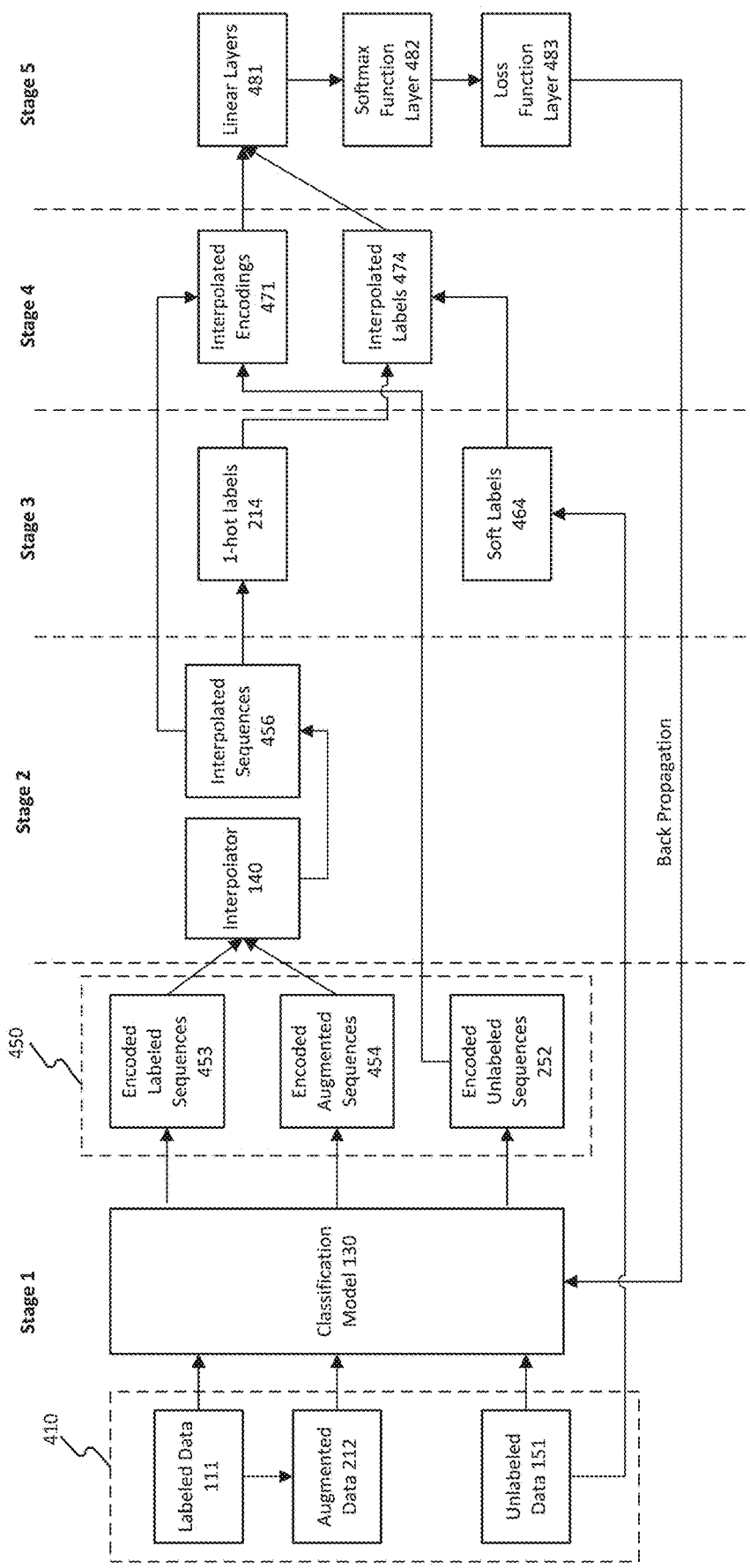
FIG. 4 is a flow diagram of exemplary pre-training of a text classification system, consistent with embodiments of the present disclosure.

FIG. 4 is a flow diagram of an exemplary pre-training of text classification system (e.g., text classification system 100 from FIG. 1B), consistent with embodiments of the present disclosure. Text classification system 100 pre-training includes the transformation of data 410 by going through various stages 1 through 5 and can include back propagating the transformed data for further training of classification model 130 of text classification system 100. Data 410 can include both labeled data 111 and unlabeled data 151. Data 410 can also include augmented data 212 generated from labeled data 111. Text classification system 100 can use data 410 to generate the training data necessary to pre-train classification model 130. Data 410 can aid text classification system 100 to rely on limited labeled pre-training data (e.g., labeled data 111) to train the classification model 130. Classification model 130 can utilize augmented data 212 generated using labeled data 111 and other unlabeled data 151 in order to train classification model 130 in a cost-effective manner.

In stage 1, Classification model 130 can generate encoded data 450 of data 410 by using encoding layer 131. Encoded data 450 can include separate encoded labeled sequences 453 and encoded augmented sequences 454 generated from labeled data 111 and augmented data 212 of data 410. Similarly, classification model 130 can generate encoded unlabeled sequences 252 using unlabeled data 151 of data 410. The encoded data can include additional embeddings (such as tags) indicating various tokens such as the beginning and end of a sequence of tokens, sentence separators, positional information of each token, and label of each sentence within data 410. In some embodiments, the encoded data can be represented in vector format. The vector format of the data can be generated using an encoding layer of a language model, such as BERT to generate text in vector format, or a layer within classification model 130 can transform the data into a vector format for easy computation and transformations of data 410.

In stage 2, encoded data 450 can be used to generate additional data for training classification model 130. The additional data can be generated using an interpolation technique offered by an interpolator 140. Interpolator 140 can apply convex interpolation between two sentences in encoded data 450 represented by two vectors of multiple dimensions. A convex interpolation applied between vectors of encoded data 450 including encoded labeled sequences 453 and encoded augmented sequences 454 can generate interpolated sequences 456. In some embodiments, the interpolation can be achieved by a layer in classification model 130.

In stage 3, classification model 130 can apply labels to both generated and transformed data (e.g., augmented data 212 and encoded data 450). Application of labels such as 1-hot labels 214 to interpolated sequences 456 (includes augmented data 212, interpolated data 213) can be based on human annotations (e.g., labels) of labeled data 111. Each interpolated sequence can have a single label applied based on the label associated with data in labeled data 111, from which augmented data 212 and interpolated sequences 456 are generated. In some embodiments, similar interpolated sequences can be generated from various labeled data and can use a consensus algorithm to determine the label. In some embodiments, a majority voting algorithm can be used to determine the label. Encoded unlabeled sequences 252 can have soft labels 464 applied using a close guess algorithm. A close guess algorithm can be based on the proximity of encoded unlabeled sequences 252, encoded labeled sequences 453, and encoded augmented sequences 454. Proximity of the sequences can be determined based on the proximity of vectors of encoded data 450. In some embodiments, the label determination process can include averaging multiple versions of labels generated by classification model 130. The averaging process can include averaging vectors representing the multiple labels. This label determination process can be part of MixMatch method as described in FIG. 1 above.

In stage 4, the interpolated sequences 456 generated from labeled data 111 and augmented data 212 are connected to encoded unlabeled sequences 252 generated from unlabeled data 151 to generate interpolated encodings 471. Interpolated Labels 474 to be associated with the interpolated encodings 471 can also be generated using interpolation techniques. The interpolation between sequences from labeled and unlabeled data creates additional data with good labels and proximity to the original input data in labeled data 111.

In stage 5, the interpolated encodings 471 and interpolated labels 474 are passed through linear layers 481 of classification model 130 or a separate machine learning model. These layers can help in identifying data closely related to data in labeled data 111.

Linear layers 481 can include classification layers 311-314 of FIG. 3A. Linear layers 481 can generate a prediction score for each class of a classification task conducted by a classification layer of classification layers 311-314 based on interpolated encodings. For example, a sentiment classification task conducted by a Sentiment Analysis layer 314 can include sentiment class with values positive, neutral and negative. In some embodiments, the classes can be represented by a vector, for example, the sentiment class can be represented by vector (1.6, 0.0, 0.8) indicating the positive, neutral, and negative values.

SoftMax layer 482 can help understand the probabilities of each encoding and the associated labels. SoftMax layer 482 can understand the probabilities of each encoding by convert prediction scores of classes into a probabilistic prediction of input instance (e.g., input sentence 170). The conversion can include converting a vector representing classes of a classification task to probability percentages. For example, input sentence 170 with a vector (1.6, 0.0, 0.8) representing various values of the sentiment class can be provided as input to SoftMax layer 482 to generate probability of positive, neutral, negative values of the sentiment classes. The output vector of probabilities generated by SoftMax layer 482 can be close to a one-hot distribution. SoftMax layer 482 output proximity to a distribution of percentages can be based on properties of a SoftMax function used by SoftMax layer 482.

Loss function layer 483 can help determine how far from the original data (e.g., data 410) is the data generated through the process represented by stages 1-4 in FIG. 4. Loss function layer 483 can be a cross entropy loss or the L2 loss functions. Loss function layer 483 can be used compare the probabilistic output of SoftMax layer 482 with 1-hot or soft label to compute a score on dissimilarity between output and label.

The Back Propagation step of stage 5 (shown in FIG. 4 as an arrow between Loss Function Layer 483 and classification model 130) can update Linear layers 481 and other layers in Classification Model 130. The update can result in generation of more accurate prediction for future usage of the models and layers. Various techniques such as Adam algorithm, Stochastic Gradient Descent (SGD), SGD with Momentum can be used to update parameters in layers in classification model 130 and other layers.

FIG. 5 shows a table of exemplary data augmentation operators used by data augmentation tool 120 of classification model 130 of FIG. 1 on an example input sentence, consistent with embodiments of the present disclosure. Data augmentation operators include both operators applied to non-target and target tokens. Data augmentation operators applied to non-target tokens can include token replacement (TR), token insertion (INS), token deletion (DEL), and token swap (SW). Data augmentation operators applied to non-target tokens can be done one at a time. The new token replacing the old non-target token can be generated from other sentences in labeled data 111. The new token can be a target token. A delete operator can be reduced to replace a non-target token with a new empty token. Data augmentation operators can also include operators applied to target tokens, such as target span replacement (SPR) operator. The span replacement operator needs to identify the span (sequence of tokens) representing a target token (either subject or subject's description). The span replacement operator can replace a target token with a non-target token in the input sentence or other sentences in the labeled data 111. In some embodiments, span replacement can also include replacement with an empty span resulting in deletion of a sequence of target tokens.

Figure 6:
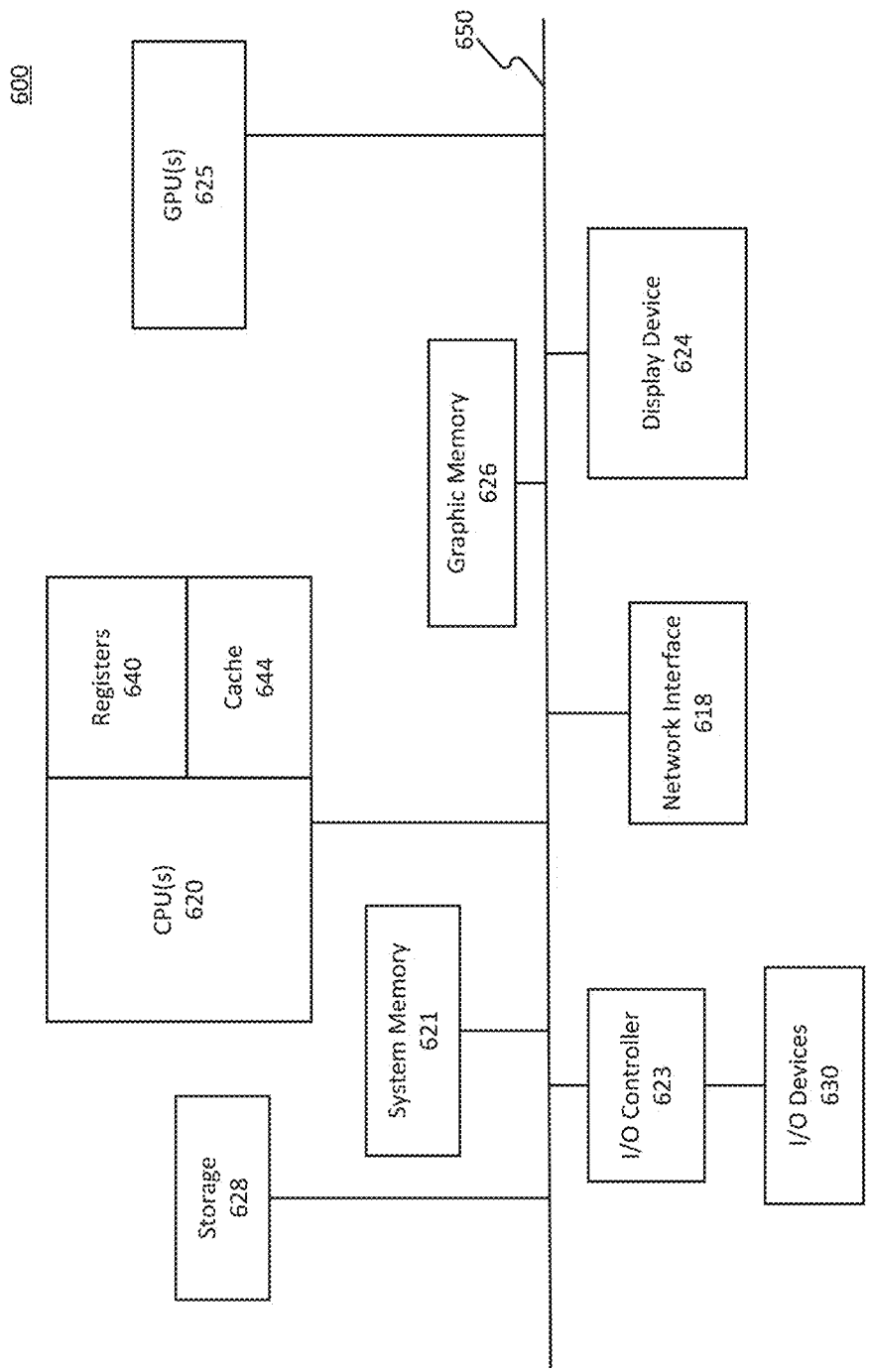
FIG. 6 is a block diagram of an exemplary computing device, consistent with embodiments of the present disclosure.

FIG. 6 is a block diagram of an exemplary computing device 600, consistent with embodiments of the present disclosure. In some embodiments, computing device 600 can be a specialized server providing the functionality described herein. In some embodiments, components of text classification system 100, such as labeled data repository 110, data augmentation tool 120, classification model 130, interpolator 140, and unlabeled data repository 150 of FIG. 1, can be implemented using the computing device 600 or multiple computing devices 600 operating in parallel. Further, the computing device 600 can be a second device providing the functionality described herein or receiving information from a server to provide at least some of the described functionality. Moreover, the computing device 600 can be an additional device or devices that store or provide data consistent with embodiments of the present disclosure and, in some embodiments, computing device 600 can be a virtualized computing device such as a virtual machine, multiple virtual machines, or a hypervisor.

Computing device 600 can include one or more central processing units (CPUs) 620 and a system memory 621. Computing device 600 can also include one or more graphics processing units (GPUs) 625 and graphic memory 626. In some embodiments, computing device 600 can be a headless computing device that does not include GPU(s) 625 or graphic memory 626.

CPUs 620 can be single or multiple microprocessors, field-programmable gate arrays, or digital signal processors capable of executing sets of instructions stored in a memory (e.g., system memory 621), a cache (e.g., cache 641), or a register (e.g., one of registers 640). CPUs 620 can contain one or more registers (e.g., registers 640) for storing various types of data including, inter alia, data, instructions, floating-point values, conditional values, memory addresses for locations in memory (e.g., system memory 621 or graphic memory 626), pointers and counters. CPU registers 640 can include special-purpose registers used to store data associated with executing instructions such as an instruction pointer, an instruction counter, or a memory stack pointer. System memory 621 can include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 621 can be one or more memory chips capable of storing data and allowing direct access by CPUs 620. System memory 621 can be any type of random-access memory (RAM), or other available memory chip capable of operating as described herein.

CPUs 620 can communicate with system memory 621 via a system interface 650, sometimes referred to as a bus. In embodiments that include GPUs 625, GPUs 625 can be any type of specialized circuitry that can manipulate and alter memory (e.g., graphic memory 626) to provide or accelerate the creation of images. GPUs 625 can have a highly parallel structure optimized for processing large, parallel blocks of graphical data more efficiently than general-purpose CPUs 620. Furthermore, the functionality of GPUs 625 can be included in a chipset of a special purpose processing unit or a co-processor.

CPUs 620 can execute programming instructions stored in system memory 621 or other memory, operate on data stored in memory (e.g., system memory 621), and communicate with GPUs 625 through the system interface 650, which bridges communication between the various components of the computing device 600. In some embodiments, CPUs 620, GPUs 625, system interface 650, or any combination thereof, are integrated into a single chipset or processing unit. GPUs 625 can execute sets of instructions stored in memory (e.g., system memory 621), to manipulate graphical data stored in system memory 621 or graphic memory 626. For example, CPUs 620 can provide instructions to GPUs 625, and GPUs 625 can process the instructions to render graphics data stored in the graphic memory 626. Graphic memory 626 can be any memory space accessible by GPUs 625, including local memory, system memory, on-chip memories, and hard disk. GPUs 625 can enable displaying of graphical data stored in graphic memory 626 on display device 624 or can process graphical information and provide that information to connected devices through network interface 618 or I/O devices 630.

Computing device 600 can include a display device 624 and input/output (I/O) devices 630 (e.g., a keyboard, a mouse, or a pointing device) connected to I/O controller 623. I/O controller 623 can communicate with the other components of computing device 600 via system interface 650. It should now be appreciated that CPUs 620 can also communicate with system memory 621 and other devices in manners other than through system interface 650, such as through serial communication or direct point-to-point communication. Similarly, GPUs 625 can communicate with graphic memory 626 and other devices in ways other than system interface 650. In addition to receiving input, CPUs 620 can provide output via I/O devices 630 (e.g., through a printer, speakers, bone conduction, or other output devices).

Furthermore, the computing device 600 can include a network interface 618 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 618 can comprise a built-in network adapter, network interface card, PCMCIA network card, card bus network adapter, wireless network adapter, USB network adapter, modem, or any other device suitable for interfacing the computing device 600 to any type of network capable of communication and performing the operations described herein.

Figure 7:
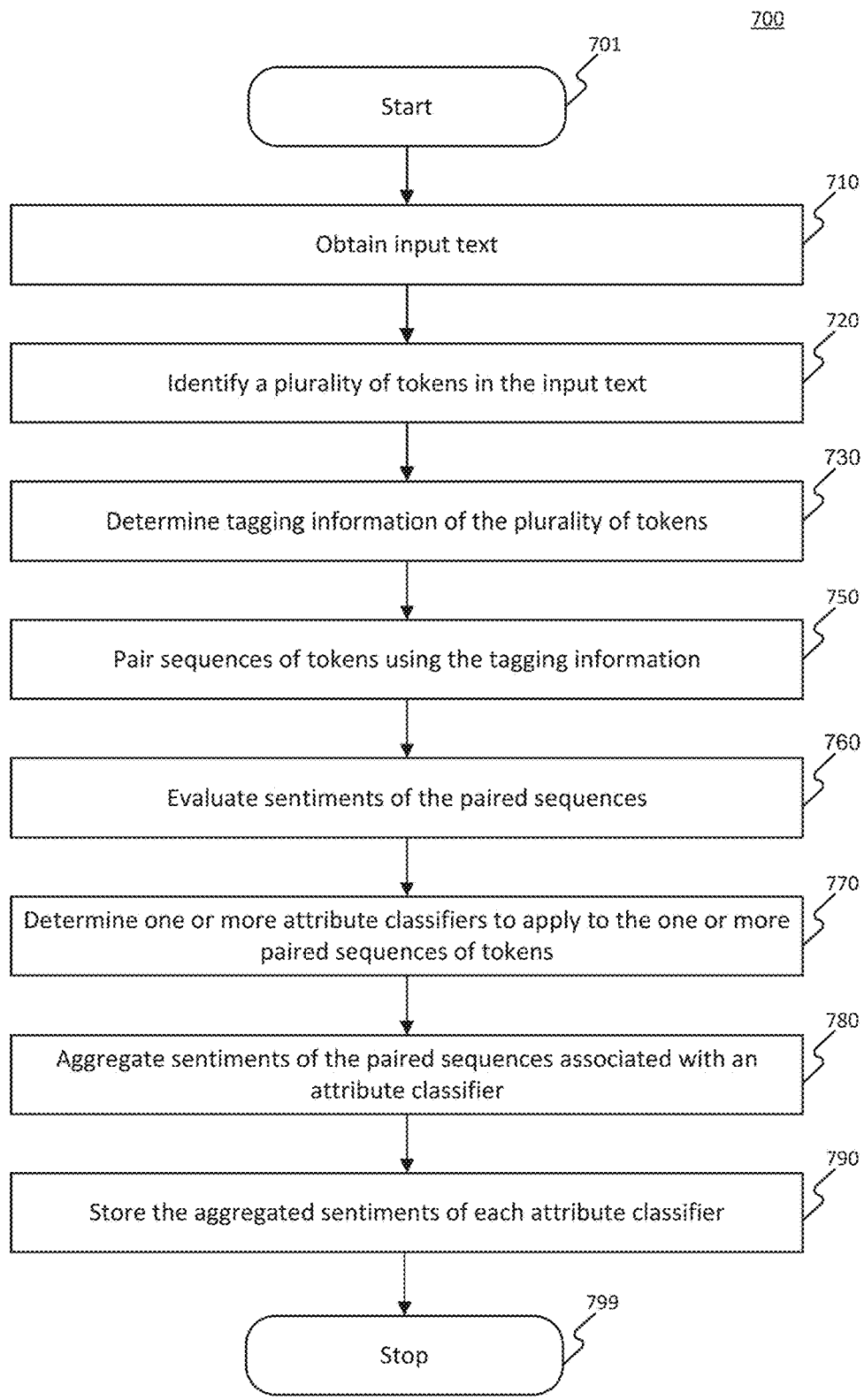
FIG. 7 is a flowchart showing an exemplary method for extracting classification information from input text using a text classification system, consistent with embodiments of the present disclosure.

FIG. 7 is a flowchart showing an exemplary method for extracting classification information from a text classification system, consistent with embodiments of the present disclosure. The steps of method 700 can be performed by, for example, text classification system 100 of FIG. 1 executing on or otherwise using the features of computing device 600 of FIG. 6 for purposes of illustration. It is appreciated that the illustrated method 700 can be altered to modify the order of steps and to include additional steps.

In step 710, text classification system 100 can obtain input text. Text classification system 100 can obtain the input text over a network at, for example, network interface 618. If not received from labeled data repository 110, text classification system 100 can store the input text in labeled data repository 110, which can be present in, for example, storage 628. Input text received by the text classification system 100 can be a combination of one or more input sentences or phrases. Text classification system 100 can pre-process the received input text using data augmentation tool 120 and interpolator 140 prior to storing it in the labeled data repository 110. In some embodiments, the preprocessing steps can include one or more of the steps defined in methods 1000 and 1100 described below.

In step 720, text classification system 100 can identify a plurality of tokens in the input text using tagging layer 311 of classification model 310. The tagging layer 311 can store identified target and non-target tokens in memory (e.g., system memory 621) before being processed by other layers of classification model 130.

In step 730, text classification system 100 can determine tagging information of the plurality of tokens using tagging layer 311. In some embodiments, tagging layer 311 can delegate the tagging task to encoding layer 131 to encode the identified tokens with tags for target and non-target tokens. Text classification system 100 can generate additional tagging information describing the type of target token (subject, description of the subject). The tagging information can also include metadata such as positions of the tokens and the phrase number within the input text.

In step 740, text classification system 100 can pair sequences of tokens using the tagging information with the help of pairing layer 312. The paired sequences of tokens can include tokens representing a subject and a description of the subject. The pairing information of sequences of tokens can be stored in system memory 621 for access by other classification layers 311-314 to extract additional classification information.

In step 750, text classification system 100 can evaluate the sentiment of the paired sequences of tokens identified in step 740. Sentiment analysis layer 314 can be used to evaluate the sentiment of a tone used in the description of the subject identified by paired subject and description target token sequences. A detailed description of configuration of possible sentiment values and evaluation of sentiment values for a sequence of tokens representing a subject's description can be found in FIG. 3A in the description of sentiment analysis layer 314 above.

In step 760, text classification system can determine one or more attribute classifiers to apply to the one or more paired sequences of tokens using attribution layer 313. Attribution layer 313 determines an attribute (e.g., attribute "Service" 351) to be applied to a sequence of tokens representing a subject target token identified in step 720. Additional details of determining attributes based on identified subject target tokens in paired sequence of tokens is presented in FIG. 3A in the description of attribution layer 313 above.

In step 770, text classification system 100 can aggregate sentiments of the paired sequences associated with an attribute classifier. The sentiment values calculated per subject target token are summed together after the determination of common attributes associated with the subject target tokens. A detailed description of aggregation of sentiment values per attribute can be found in the FIGS. 3A and 3B descriptions above.

In step 780, text classification system 100 can store the aggregate sentiment of each attribute classifier. The attributes and sentiment values classification information determined by text classification system 100 can be stored permanently in data storage (e.g., storage 628). In some embodiments, some of the classification information (identified tokens in step 720, paired tokens in step 740, evaluated sentiment values in step 750, and determined attributes in step 760) can be stored temporarily in system memory for the next step of method 700. Text classification system 100, upon completion of step 780, completes (step 799) executing method 700 on computing device 600.

Figure 8:
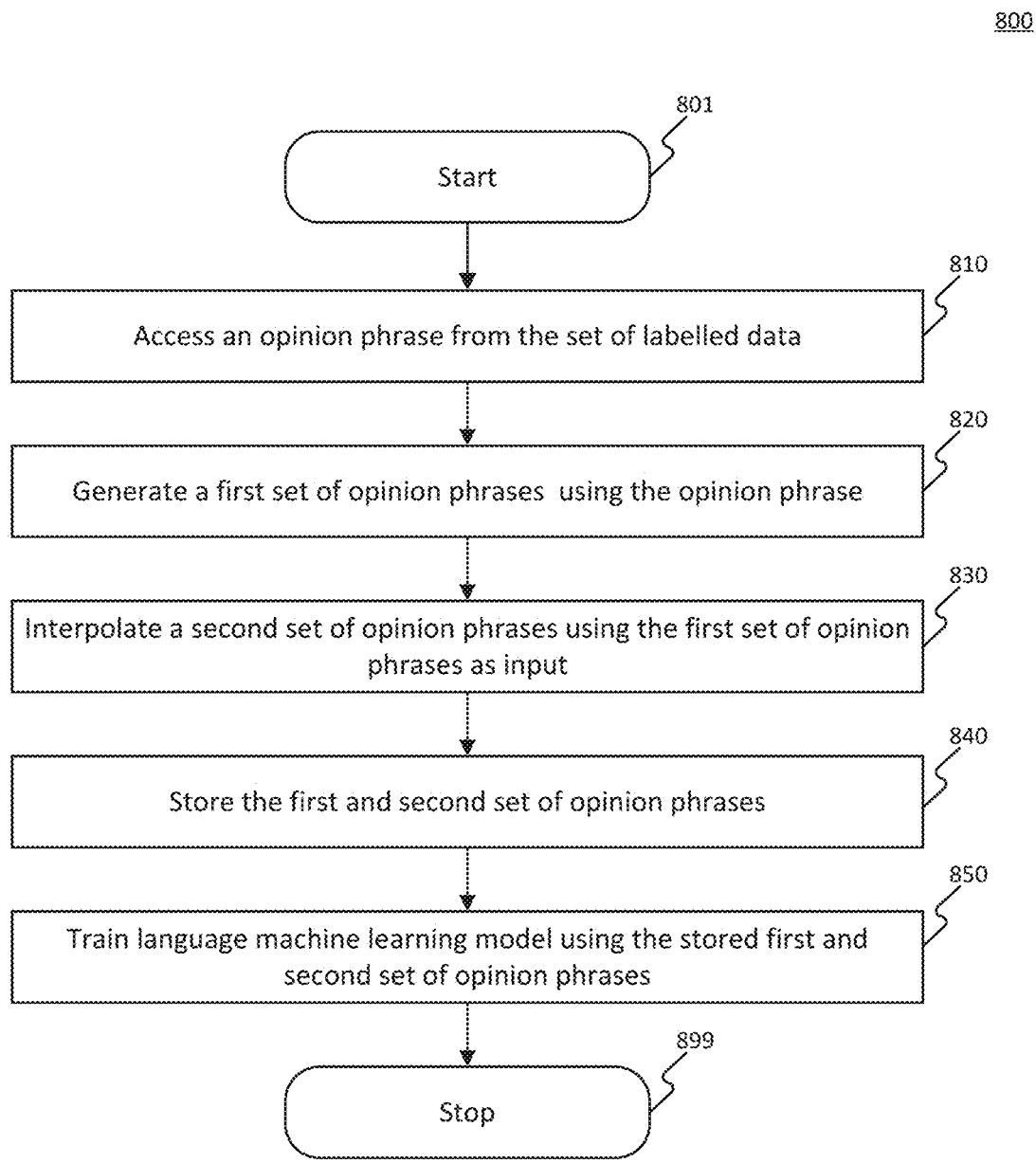
FIG. 8 is a flowchart showing an exemplary method for generating training data for a machine learning classification model, consistent with embodiments of the present disclosure.

FIG. 8 is a flowchart showing an exemplary method for generating training data for a language machine learning model (e.g., classification model 130 of FIG. 1), consistent with embodiments of the present disclosure. The steps of method 800 can be performed by text classification system 100 of FIG. 1 executing on or otherwise using the features of computing device 600 of FIG. 6 for purposes of illustration. It is appreciated that the illustrated method 800 can be altered to modify the order of steps and to include additional steps.

In step 810, text classification system 100 can access an opinion phrase from the set of labeled data (e.g., labeled data 111). An opinion phrase can be a description of a subject identified by tagging layer 311 of classification model 310. An opinion phrase can be a sequence of tokens identified by classification model 310 a variation of classification model 130 and can be accessed from memory (e.g., system memory 621) or storage (e.g., storage 628).

In step 820, text classification system 100 can generate a first set of opinion phrases using the opinion phrase selected in step 810. Data augmentation tool 120 can be used to generate the first set of opinion phrases. Data augmentation tool 120 can generate the first set of opinion phrases by using data augmentation operations as described in FIG. 5 description above. As described in FIG. 5 above, a data augmentation operator (e.g., one of data augmentation operators 121 of FIG. 1) such as a span replacement operator (SPR) can replace a sequence of target tokens forming a span.

In step 830, text classification system 100 can interpolate a second set of opinion phrases using the first set of opinion phrases as input. Interpolator 140 can be used to interpolate the first set of opinion phrases to generate the second set of opinion phrases. As described in FIG. 1 above, interpolator 140 can apply a convex interpolation technique to interpolate between two phrases. The interpolated opinion phrases may need to be transformed to a vector format before application of an interpolation technique to generated interpolated phrases between two selected opinion phrases.

In step 840, text classification system 100 can store the first and second set of opinion phrases in storage (e.g., storage 628). The first set of opinion phrases can be used to generate augmented data 212. The second set of opinion phrases can be used to generate interpolated data 213. In some embodiments, the augmented data 212 and interpolated data 213 can be combined to generate interpolated encodings 471, as described in the FIG. 4 description above.

In step 850, text classification system 100 can train a language machine learning model (e.g., classification model 130) using the stored first and second set of opinion phrases. The training can involve using the additional data generated using the first and second set of opinion phrases. Text classification system 100, upon completion of step 850, completes (step 899) executing method 800 on computing device 600.

Figure 9:
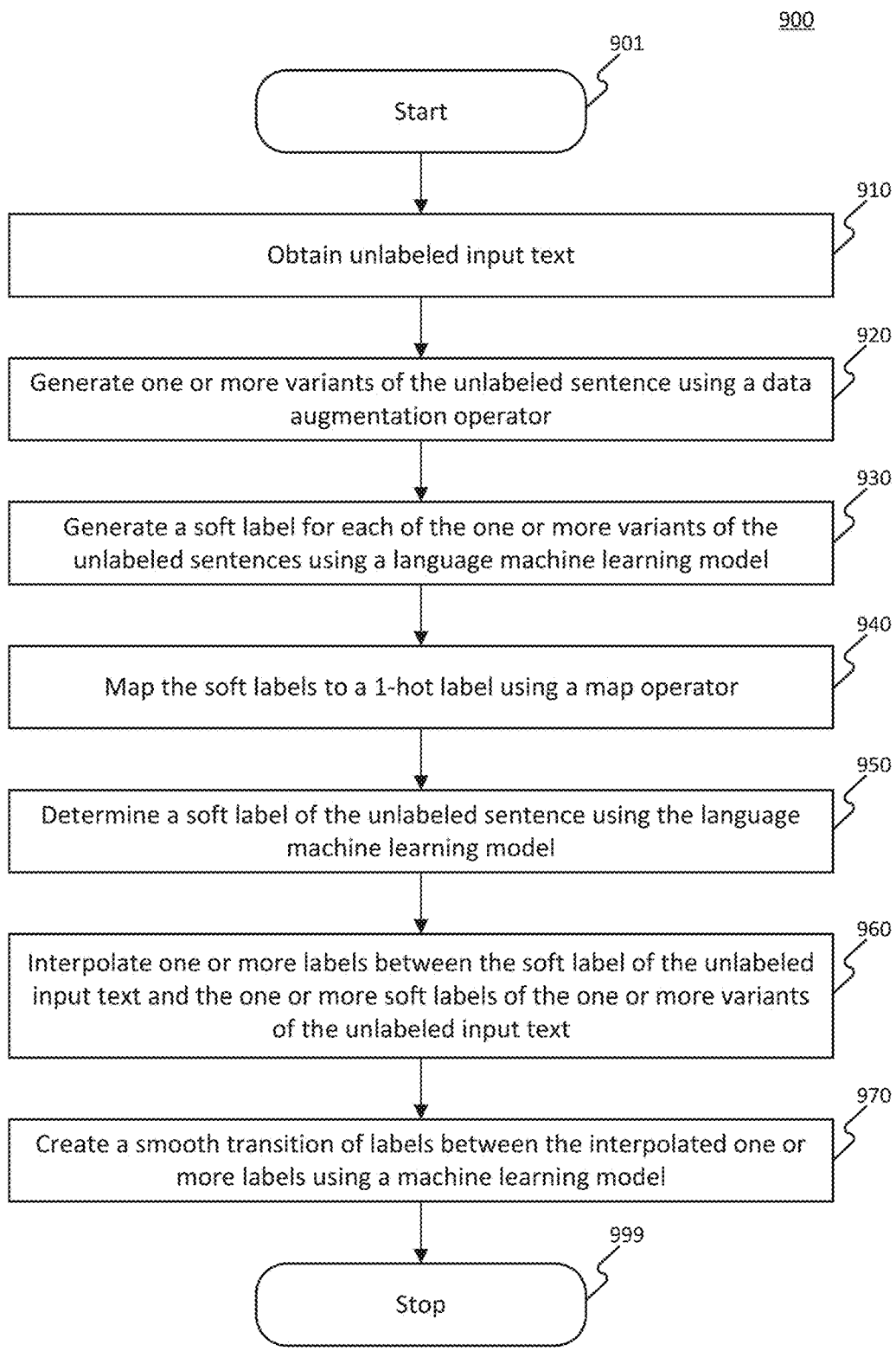
FIG. 9 is a flowchart showing an exemplary method for adapting machine learning classification model utilizing unlabeled data, consistent with embodiments of the present disclosure.

FIG. 9 is a flowchart showing an exemplary method for adapting a machine learning model (e.g., classification model 130 of FIG. 1) to utilize unlabeled data 151, consistent with embodiments of the present disclosure. The steps of method 900 can be performed by text classification system 100 of FIG. 1 executing on or otherwise using the features of computing device 600 of FIG. 6 for purposes of illustration. It is appreciated that the illustrated method 900 can be altered to modify the order of steps and to include additional steps.

In step 910, text classification system 100 can obtain unlabeled input text from unlabeled data 151 stored in unlabeled data repository 150. In some embodiments, access to an unlabeled input text can include the execution of a database query to access an input sentence from unlabeled data repository 150. Unlabeled input text can be a combination of one or more input sentences or phrases.

In step 920, text classification system 100 can generate one or more variants of the unlabeled sentence using a data augmentation operator chosen from a table of operations described in FIG. 5 description above. Text classification system 100 can select data augmentation operator based on predefined criteria. The predefined criteria can be based on the subject in an unlabeled sentence. In some embodiments, predefined criteria can be based on length of the unlabeled sentence (number of words, number of characters).

In step 930, text classification system 100 can generate a soft label for each of the one or more variants of the unlabeled sentences using a language machine learning model (e.g., classification model 130). Machine learning model (e.g., classification model 130) can determine the unlabeled input text's proximity to one or more sentences in the labeled data 111. Text classification system 100 can determine proximity by calculating the difference between the unlabeled input text and the sentence from labeled data 111 in vector formats.

In step 940, text classification system 100 can map the soft labels to a 1-hot label using a map operator. The 1-hot labels (e.g., 1-hot labels 214) can be associated with sentences in labeled data 111. The mapping process can include seeing the closest sentence in labeled data to the unlabeled input text. In some embodiments, each soft label is associated with a 1-hot label using a randomized algorithm.

In step 950, text classification system 100 can determine a soft label of the unlabeled sentence using the language machine learning model (e.g., classification model 130). Text classification system 100 can determine soft labels based on proximity of the unlabeled sentence to one or more labeled sentences with annotated labels. The proximity value can be determined by comparing unlabeled and labeled sentences in vector formats.

In step 960, text classification system 100 can interpolate one or more labels between the unlabeled input text's soft label and the one or more soft labels of the one or more variants of the unlabeled input text. Interpolator 140 can perform interpolation of labels between soft labels. Interpolator 140 can identify closest sentences in labeled data 111 that match the unlabeled input text to determine the interpolated labels. In some embodiments, Interpolator 140 can randomly associate labeled and unlabeled sentences. The random association between labeled and unlabeled sentence can be based on random association of soft-labels and 1-hot labels assigned to unlabeled and labeled sentences respectively. In step 970, text classification system 100 can create a smooth transition of labels between the interpolated one or more labels using a machine learning model. The smooth transition of labels includes alternate labels annotating labeled sentences in close proximity determined by comparing sentences' vectors. Text classification system 100, upon completion of step 970, completes (step 999) executing method 900 on computing device 600.

Figure 10:
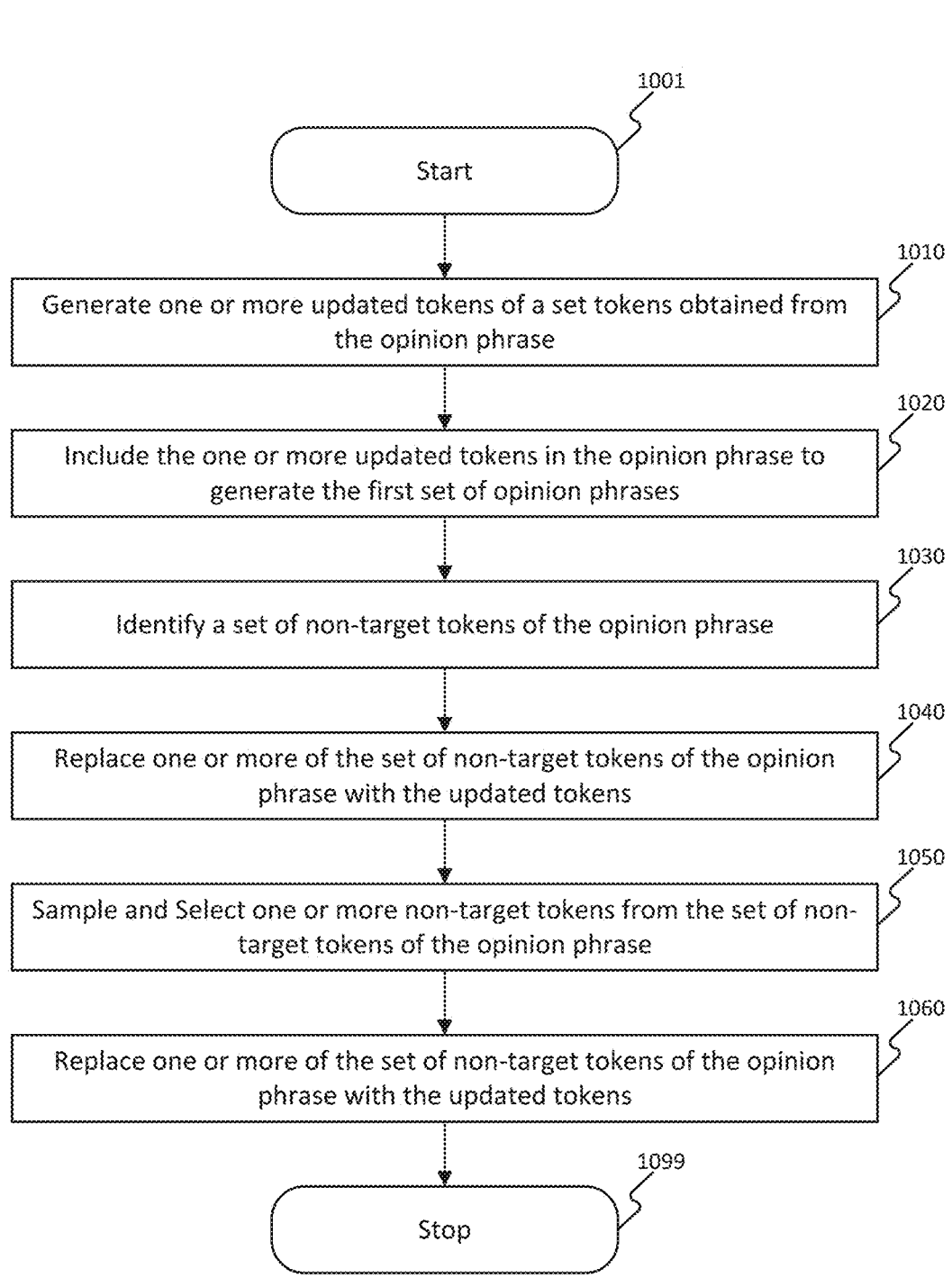
FIG. 10 is a flowchart showing an exemplary method for using data augmentation technique to generate training data for a machine learning classification model, consistent with embodiments of the present disclosure.

FIG. 10 is a flowchart showing an exemplary method for using data augmentation techniques to generate training data for a language machine learning model (e.g., classification model 130 of FIG. 1), consistent with embodiments of the present disclosure. The steps of method 1000 can be performed by text classification system 100 of FIG. 1 executing on or otherwise using the features of computing device 600 of FIG. 6 for purposes of illustration. It is appreciated that the illustrated method 1000 can be altered to modify the order of steps and to include additional steps.

In step 1010, text classification system 100 can generate one or more updated tokens of a set of tokens obtained from the opinion phrase. The updated tokens can be generated by identifying sentences in labeled data 111 with a similar structure to the sentence containing the opinion phrase.

In step 1020, text classification system 100 can include one or more updated tokens in the opinion phrase to generate the first set of opinion phrases. Text classification system 100 can generate updated tokens using data augmentation operators described in FIG. 5 description above. The data augmentation operator's selection to update and the token to be updated can be based on predefined criteria. In some embodiments, the updated tokens can be generated by application of more than one data augmentation operator.

In step 1030, text classification system 100 can identify a set of non-target tokens of the opinion phrase. The non-target tokens can represent any words in the opinion phrase that are directed to the subject in the opinion phrase or the description of the subject.

In step 1040, text classification system 100 can replace one or more of the sets of non-target tokens from the set of non-target tokens of the opinion phrase.

In step 1050, text classification system 100 can sample and select one or more non-target tokens from the set of non-target tokens of the opinion phrase.

In step 1060, text classification system 100 can replace one or more of the sets of non-target tokens of the opinion phrase with the updated tokens. Text classification system 100, upon completion of step 1060, completes (step 1099) executing method 1000 on computing device 600.

Figure 11:
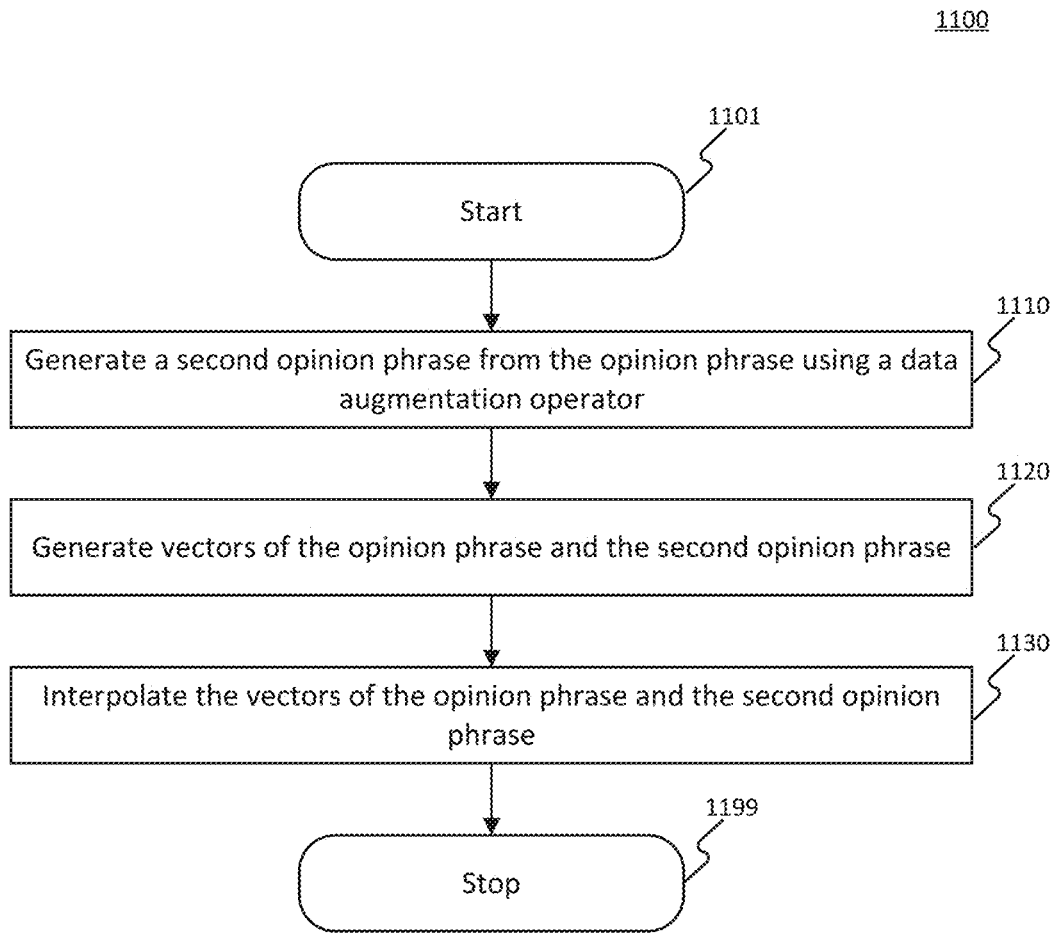
FIG. 11 is a flowchart showing an exemplary method for using interpolation technique to generate training data for a machine learning classification model, consistent with embodiments of the present disclosure.

FIG. 11 is a flowchart showing an exemplary method for using interpolation technique to generate training data for a language machine learning model (e.g., classification model 130 of FIG. 1), consistent with embodiments of the present disclosure. The steps of method 1100 can be performed by text classification system 100 of FIG. 1 executing on or otherwise using the features of computing device 600 of FIG. 6 for purposes of illustration. It is appreciated that the illustrated method 1100 can be altered to modify the order of steps and to include additional steps.

In step 1110, text classification system 100 can generate a second opinion phrase from the opinion phrase using a data augmentation operator. The data augmentation operator can include operators applied to non-target tokens and target tokens. In some embodiments, multiple data augmentation operators can be applied in a serial fashion. In some embodiments, multiple data augmentation operators can be applied to the same data at different times to generate different opinion phrases.

In step 1120, text classification system 100 can generate vectors of the opinion phrase and the second opinion phrase. Encoding layer 131 can be used by text classification system 100 to generate data in vector format (e.g., encoded augmented sequences 454).

In step 1130, text classification system 100 can interpolate the vectors of the opinion phrase (e.g., encoded labeled sequences 453) and the second opinion phrase (e.g., encoded augmented sequences 454). Interpolator 140 can be used for interpolation between data represented in vector format to generate new data (e.g., interpolated sequences 456). Text classification system 100, upon completion of step 1130, completes (step 1199) executing method 1100 on computing device 600.

Example embodiments are described above with reference to flowchart illustrations or block diagrams of methods, apparatus (systems), and computer program products. It will be understood that each block of the flowchart illustrations or block diagrams, and combinations of blocks in the flowchart illustrations or block diagrams, can be implemented by computer program product or instructions on a computer program product. These computer program instructions can be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions can also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions can also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart or block diagram block or blocks Any combination of one or more computer readable medium(s) can be utilized. The computer readable medium can be a non-transitory computer readable storage medium. In the context of this document, a computer readable storage medium can be any tangible medium that can contain or store a program for use by or in connection with an instruction execution system, apparatus, or device.

Program code embodied on a computer readable medium can be transmitted using any appropriate medium, including but not limited to wireless, wireline, optical fiber cable, RF, IR, etc., or any suitable combination of the foregoing.

Computer program code for carrying out operations, for example, embodiments can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). The computer program code can be compiled into object code that can be executed by a processor or can be partially compiled into intermediary object code or interpreted in an interpreter, just-in-time compiler, or a virtual machine environment intended for executing computer program code.

The flowchart and block diagrams in the figures illustrate examples of the architecture, functionality, and operation of possible implementations of systems, methods, and computer program products according to various embodiments. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment can be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by a text classification system that includes one or more processors to cause the text classification system to perform a method for extracting classification information, the method comprising:
obtaining input text;
identifying a plurality of tokens in the input text;
pre-training a machine learning model by:
  accessing an opinion phrase from a set of labeled data;
  generating a first set of opinion phrases using the opinion phrase, wherein the generating comprises replacing of a span in the opinion phrase and storing the opinion phrase with the replaced span;
  interpolating a second set of opinion phrases using the first set of opinion phrases;
  storing the first and second set of opinion phrases; and
  providing the first and second set of opinion phrases for training the machine learning model;
determining tagging information of the plurality of tokens using a first classification layer of the machine learning model;
pairing sequences of tokens using the tagging information associated with the plurality of tokens, wherein the paired sequences of tokens are determined by a second classification layer of the machine learning model;
determining one or more attribute classifiers to apply to the one or more paired sequences, wherein the attribute classifiers are determined by a third classification layer of the machine learning model;
evaluating sentiments of the paired sequences, wherein the sentiments of the paired sequences are determined by a fourth classification layer of the machine learning model;
aggregating sentiments of the paired sequences associated with an attribute classifier of the one or more attribute classifiers; and
storing the aggregated sentiments of each attribute classifier and the one or more attribute classifiers.

2. The non-transitory computer readable storage medium of claim 1, wherein generating the first set of opinion phrases using the opinion phrase further comprises:
generating one or more updated tokens of a set of tokens obtained from the opinion phrase; and
including the one or more updated tokens in the opinion phrase to generate the first set of opinion phrases.

3. The non-transitory computer readable storage medium of claim 2, wherein including the one or more updated tokens in the opinion phrase to generate the first set of opinion phrases further comprises:
identifying a set of non-target tokens of the opinion phrase; and
replacing one or more non-target tokens of the set of non-target tokens of the opinion phrase with the updated tokens to generate the first set of opinion phrases.

4. The non-transitory computer readable storage medium of claim 3, wherein replacing the one or more non-target tokens further comprises:
sampling and selecting the one or more non-target tokens from the set of non-target tokens of the opinion phrase.

5. The non-transitory computer readable storage medium of claim 4, wherein sampling and selecting the one or more non-target tokens comprises of uniform sampling, weight-based sampling, vector similarity sampling.

6. The non-transitory computer readable storage medium of claim 3, wherein replacing one or more non-target tokens further comprises replacement, insertion, deletion, and/or swapping of the one or more non-target tokens and the updated tokens.

7. The non-transitory computer readable storage medium of claim 3, wherein the non-target tokens comprise at least one of words, phrases, or punctuation marks of the input text.

8. The non-transitory computer readable storage medium of claim 1, wherein interpolating a second set of opinion phrases using the first set of opinion phrases further comprises:
generating a second opinion phrase from the opinion phrase using a data augmentation operator;
generating vectors of the opinion phrase and the second opinion phrase; and
interpolating the vectors of the opinion phrase and the second opinion phrase.

9. The non-transitory computer readable storage medium of claim 1, wherein replacing of a span further comprises replacing one or more target tokens.

10. The non-transitory computer readable storage medium of claim 1, wherein pairing sequences of tokens using the tagging information associated with the plurality of tokens further comprises:
identifying a plurality of target tokens of the plurality of tokens of the input text; and
generating one or more tuples of target tokens each comprising two target tokens.

11. The non-transitory computer readable storage medium of claim 10, wherein a first element of the one or more tuples is an aspect.

12. The non-transitory computer readable storage medium of claim 11, wherein a second element of the one or more tuples is an opinion expression.

13. The non-transitory computer readable storage medium of claim 1, wherein the sentiments of the paired sequences are one of positive, negative, or neutral.

14. The non-transitory computer readable storage medium of claim 1, wherein the instructions that are executable by the text classification system that includes one or more processors cause the text classification system to further perform:
obtaining unlabeled input text;
generating one or more variants of the unlabeled input text using a data augmentation operator;
generating one or more soft labels of one for each of the one or more variants of the unlabeled input text, wherein one or more soft labels are generated using a language machine learning model; and
mapping using a map operator the generated one or more soft labels to a 1-hot label.

15. The non-transitory computer readable storage medium of claim 14, wherein the instructions that are executable by the text classification system that includes one or more processors cause the text classification system to further perform:
determining a soft label of the unlabeled input text using the language machine learning model;
interpolating one or more labels between the soft label of the unlabeled input text and the one or more soft labels of the one or more variants of the unlabeled input text; and
enforcing the machine learning model to create a smooth transition between the interpolated one or more labels.

16. A method performed by a system for extracting text classification information, the method comprising:
obtaining input text;
identifying a plurality of tokens in the input text;
pre-training a machine learning model by:
accessing an opinion phrase from a set of labeled data;
generating a first set of opinion phrases using the opinion phrase, wherein the generating comprises replacing of a span in the opinion phrase and storing the opinion phrase with the replaced span;
interpolating a second set of opinion phrases using the first set of opinion phrases;
storing the first and second set of opinion phrases; and
providing the first and second set of opinion phrases for training the machine learning model;
determining tagging information of the plurality of tokens using a first classification layer of the machine learning model;
pairing sequences of tokens using the tagging information associated with the plurality of tokens, wherein the paired sequences of tokens are determined by a second classification layer of the machine learning model;
determining one or more attribute classifiers to apply to the one or more paired sequences, wherein the attribute classifiers are determined by a third classification layer of the machine learning model;
evaluating sentiments of the paired sequences, wherein the sentiments of the paired sequences are determined by a fourth classification layer of the pre-trained machine learning model;
aggregating sentiments of the paired sequences associated with an attribute classifier of the one or more attribute classifiers; and
storing the aggregated sentiments of each attribute classifier and the one or more attribute classifiers.

17. The method of claim 16, wherein generating a first set of opinion phrases further comprises:
accessing an opinion phrase from the set of labeled data;
generating one or more updated tokens of a set of tokens obtained from the opinion phrase; and
including the one or more updated tokens in the opinion phrase to generate the first set of opinion phrases.

18. The method of claim 16, wherein interpolation of a second set of opinion phrases using the first set of opinion phrases further comprises:
generating a second opinion phrase from the opinion phrase using a data augmentation operator;
generating vectors of the opinion phrase and the second opinion phrase; and
interpolating the vectors of the opinion phrase and the second opinion phrase.

19. A text classification system comprising:
one or more memory devices storing processor-executable instructions; and
one or more processors configured to execute instructions to cause the text classification system to perform:
obtaining input text;
identifying a plurality of tokens in the input text;
pre-training a machine learning model by:
accessing an opinion phrase from a set of labeled data;
generating a first set of opinion phrases using the opinion phrase, wherein the generating comprises replacing of a span in the opinion phrase and storing the opinion phrase with the replaced span;
interpolating a second set of opinion phrases using the first set of opinion phrases;
storing the first and second set of opinion phrases; and
providing the first and second set of opinion phrases for training the machine learning model;
determining tagging information of the plurality of tokens using a first classification layer of the machine learning model;
pairing sequences of tokens using the tagging information associated with the plurality of tokens, wherein the paired sequences of tokens are determined by a second classification layer of the machine learning model;
determining one or more attribute classifiers to apply to the one or more paired sequences, wherein the attribute classifiers are determined by a third classification layer of the machine learning model;
evaluating sentiments of the paired sequences, wherein the sentiments of the paired sequences are determined by a fourth classification layer of the pre-trained machine learning model;
aggregating sentiments of the paired sequences associated with an attribute classifier of the one or more attribute classifiers; and
storing the aggregated sentiments of each attribute classifier and the one or more attribute classifiers.

* * * * *